United States Patent
Kirchhoffer

(10) Patent No.: US 10,563,730 B2
(45) Date of Patent: Feb. 18, 2020

(54) DUAL CLUTCH TRANSMISSION FOR MOTOR VEHICLES

(71) Applicant: FORD GLOBAL TECHNOLOGIES, LLC, Dearborn, MI (US)

(72) Inventor: Johann Kirchhoffer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 15/435,470

(22) Filed: Feb. 17, 2017

(65) Prior Publication Data

US 2017/0248200 A1    Aug. 31, 2017

(30) Foreign Application Priority Data

Feb. 25, 2016   (DE) .................. 10 2016 202 914

(51) Int. Cl.
  *F16H 3/00*   (2006.01)
  *F16H 3/093*  (2006.01)
  *F16H 3/08*   (2006.01)

(52) U.S. Cl.
  CPC ............ *F16H 3/093* (2013.01); *F16H 3/006* (2013.01); *F16H 2003/0826* (2013.01);
  (Continued)

(58) Field of Classification Search
  CPC .... F16H 3/093; F16H 3/006; F16H 2003/008; F16H 2003/0826; F16H 2003/0931; F16H 2200/0073
  See application file for complete search history.

(56) References Cited

U.S. PATENT DOCUMENTS

| | | | |
|---|---|---|---|
| 6,591,705 B1 * | 7/2003 | Reik | B60W 10/02 74/343 |
| 7,246,536 B2 | 7/2007 | Baldwin | |

(Continued)

FOREIGN PATENT DOCUMENTS

| | | |
|---|---|---|
| DE | 202009005634 U1 | 9/2010 |
| DE | 102010053130 A1 | 5/2012 |

(Continued)

OTHER PUBLICATIONS

German Search Report dated Dec. 6, 2016 for corresponding German Application No. 102016202914.2, 7 pages.

(Continued)

*Primary Examiner* — Zakaria Elahmadi
(74) *Attorney, Agent, or Firm* — David Kelley; Brooks Kushman, P.C.

(57) ABSTRACT

A dual clutch transmission for motor vehicles has first and second input shafts, two clutches configured to selectively couple the input shafts to an engine, two intermediate shafts arranged parallel to the input shafts, gearwheel pairs of which a fixed gearwheel is arranged on one of the input shafts and a freely rotating gearwheel is arranged on one of the intermediate shafts, freely rotating output gearwheels arranged on each of the two intermediate shafts and meshing with a differential wheel, and coupling devices configured to selectively couple the freely rotating gearwheels to the respective intermediate shaft, of which at least the coupling devices for the output gearwheels are of double acting design. A dual clutch transmission of this kind makes a large number of gears possible without significantly increasing the dimensions of the transmission or the weight thereof.

4 Claims, 27 Drawing Sheets

(52) U.S. Cl.
CPC ............... *F16H 2003/0931* (2013.01); *F16H 2200/006* (2013.01); *F16H 2200/0073* (2013.01); *F16H 2200/0086* (2013.01)

(56) References Cited

U.S. PATENT DOCUMENTS

| | | | |
|---|---|---|---|
| 7,340,973 B2* | 3/2008 | Hiraiwa | F16D 21/04 74/330 |
| 8,166,842 B2 | 5/2012 | Rieger | |
| 8,757,020 B2 | 6/2014 | Singh et al. | |
| 8,757,021 B2* | 6/2014 | Singh | F16H 3/006 74/330 |
| 9,003,905 B1* | 4/2015 | Lee | F16H 3/093 74/330 |
| 9,014,932 B2 | 4/2015 | Nemoto | |
| 9,239,096 B2 | 1/2016 | Noh et al. | |
| 9,297,443 B2 | 3/2016 | Lee et al. | |
| 2006/0266141 A1* | 11/2006 | Ogami | F16H 3/006 74/325 |
| 2007/0240530 A1* | 10/2007 | Ogami | F16H 63/18 74/330 |
| 2008/0202266 A1 | 8/2008 | Hendrickson et al. | |
| 2008/0245166 A1* | 10/2008 | Baldwin | F16H 3/006 74/331 |
| 2010/0218627 A1* | 9/2010 | Rieger | F16H 3/006 74/331 |
| 2010/0257952 A1 | 10/2010 | Rueger et al. | |
| 2010/0257953 A1 | 10/2010 | Rieger et al. | |
| 2010/0257958 A1 | 10/2010 | Rieger et al. | |
| 2010/0257966 A1 | 10/2010 | Rieger et al. | |
| 2010/0282019 A1* | 11/2010 | Rieger | F16H 3/006 74/665 D |
| 2011/0048168 A1* | 3/2011 | Mohlin | F16H 3/006 74/665 S |
| 2011/0185847 A1 | 8/2011 | Tanba et al. | |
| 2011/0218716 A1* | 9/2011 | Olsson | F16H 3/006 701/51 |
| 2013/0031989 A1* | 2/2013 | Singh | F16H 3/006 74/330 |
| 2013/0345018 A1* | 12/2013 | Kaltenbach | B60K 6/48 477/5 |
| 2015/0298535 A1* | 10/2015 | Luehrs | B60K 6/365 477/3 |
| 2015/0345603 A1* | 12/2015 | Kaltenbach | F16H 37/046 74/661 |
| 2016/0010725 A1 | 1/2016 | Wittkopp et al. | |
| 2016/0146320 A1* | 5/2016 | Mordukhovich | F16H 3/097 475/207 |
| 2016/0167502 A1* | 6/2016 | Choi | B60K 6/365 475/5 |
| 2016/0207392 A1* | 7/2016 | Zhang | F16H 3/006 |
| 2016/0298733 A1* | 10/2016 | Bender | F16H 3/006 |
| 2017/0305260 A1 | 10/2017 | Ruan et al. | |

FOREIGN PATENT DOCUMENTS

| | | |
|---|---|---|
| DE | 102012213332 A1 | 2/2013 |
| DE | 102013106896 B4 | 1/2015 |
| DE | 102013201387 A1 | 2/2015 |
| DE | 102013216384 A1 | 2/2015 |
| DE | 102013216385 A1 | 2/2015 |
| DE | 102013216387 A1 | 2/2015 |
| DE | 102013019120 A1 | 5/2015 |
| DE | 102013019132 A1 | 5/2015 |
| FR | 2976039 A3 | 12/2012 |
| KR | 101500390 B1 | 3/2015 |
| WO | 2012084250 A1 | 6/2012 |

OTHER PUBLICATIONS

Non-Final Office Action for U.S. Appl. No. 15/433,911, dated Aug. 5, 2019, 15 pages.

* cited by examiner

| | | IS 1 (13) | IS 2 (14) | IS 2 (14) | IS 2 (14) | IS 1 (13) | | | |
|---|---|---|---|---|---|---|---|---|---|
| K1 (2) | K2 (3) | S1 (20) | S2 (16) | S3 (18) | S5 (22) | S6 (27) | gears | commentary | interruption in tractive effort |
| 1 | 0 | L | R | 0 | R | L | 1 | winding path gear | yes |
| 0 | 1 | L | L | 0 | L | R | 2 | winding path gear | no |
| 1 | 0 | L | 0 | 0 | 0 | R | 3 | basic 1 | no |
| 0 | 1 | 0 | R | 0 | R | 0 | 4 | basic 2 | no |
| 1 | 0 | 0 | 0 | R | R | 0 | 5 | basic 3 | no |
| 0 | 1 | R | R | 0 | 0 | R | 6 | basic 4 | no |
| 1 | 0 | R | L | 0 | L | R | 7 | winding path gear | no |
| 0 | 1 | L | L | 0 | R | L | 8 | winding path gear | yes |
| 1 | 0 | L | 0 | L | 0 | 0 | R1 | winding path gear | yes |
| 0 | 1 | 0 | R | L | R | R | R2 | winding path gear | yes |

Fig. 2

| clutches 1=closed, 0=open | | Position of coupling device (L=left/R=right/0=neutral) - Fig 13 | | | | | | | gears | commentary | interruption in tractive effort |
|---|---|---|---|---|---|---|---|---|---|---|---|
| K1 (2) | K2 (3) | IS 1 (13) CD (20) | IS 2 (14) CD (16) | IS 2 (14) CD (18) | IS 1 (13) CD (36) | IS 2 (14) CD (22) | IS 1 (13) CD (27) | | | | |
| 0 | 1 | L | L | 0 | 0 | L | R | | 1 | winding path gear | yes |
| 1 | 0 | L | R | 0 | 0 | R | L | | 2 | winding path gear | |
| 0 | 1 | 0 | L | 0 | L | L | R | | 3 | winding path gear | |
| 1 | 0 | L | 0 | 0 | 0 | 0 | R | | 4 | basic 1 | no |
| 0 | 1 | 0 | R | 0 | 0 | R | 0 | | 5 | basic 2 | |
| 1 | 0 | R | 0 | 0 | R | 0 | R | | 6 | basic 3 | |
| 0 | 1 | 0 | 0 | R | 0 | 0 | R | | 7 | basic 4 | |
| 1 | 0 | 0 | 0 | R | L | R | 0 | | 8 | basic 5 | |
| 0 | 1 | 0 | 0 | R | R | L | L | | 9 | winding path gear | yes |
| 1 | 0 | L | 0 | L | 0 | R | R | | 10 | winding path gear | |
| 0 | 1 | L | 0 | L | 0 | R | L | | 11 | winding path gear | |
| 1 | 0 | 0 | 0 | 0 | 0 | L | 0 | | R1 | | |
| 0 | 1 | 0 | 0 | 0 | 0 | L | R | | R2 | | |

Fig. 14

DUAL CLUTCH TRANSMISSION FOR MOTOR VEHICLES

CROSS-REFERENCE TO RELATED APPLICATIONS

This application claims foreign priority benefits under 35 U.S.C. § 119(a)-(d) to DE 10 2016 202 914.2 filed Feb. 25, 2016, which is hereby incorporated by reference in its entirety.

TECHNICAL FIELD

The invention relates to a dual clutch transmission for motor vehicles having a first input shaft and a second input shaft, two clutches, by means of which the first input shaft and the second input shaft can be selectively coupled to the engine, two intermediate shafts arranged parallel to the transmission input shafts, gearwheel pairs of fixed wheels and freely rotating wheels, of which a first gearwheel is arranged on one of the input shafts and a second gearwheel is arranged on one of the intermediate shafts, coupling devices, by means of which the freely rotating wheels can be selectively connected to the respective intermediate shaft, and an output gearwheel arranged on each of the two intermediate shafts, wherein the output gearwheels of both intermediate shafts mesh with the differential wheel and can each be alternately connected for conjoint rotation to the respective intermediate shaft by means of one of the coupling devices.

BACKGROUND

There is an effort in the automotive industry to adapt the operating state of the engine in an optimum manner, during driving, to the current driving state of the motor vehicle in order to reduce emissions. This can be accomplished, for example, if the transmission has a large number of gears. In this case, selection is performed in such a way that the engine speed is held as low as possible, even at high driving speeds. Another aim is to keep down the masses which corotate under no load in order thereby to effect a further reduction in emissions.

In a conventional design, a large number of gears necessarily implies a relatively large number of transmission gearwheels and therefore a relatively large overall length, although this is not desired in modern motor vehicle engineering, as well as a relatively high weight of the transmission and relatively high associated power losses.

Known transmissions of the type stated at the outset (WO 2012/084250 A1; DE 10 2013 216 387 A1) are therefore already taking a step in the desired direction by providing the possibility of the power flowing both via a gearwheel stage associated with the first transmission input shaft and via a gearwheel stage associated with the second transmission input shaft.

In the case of such dual clutch transmissions, the transmission input shafts are designed as an inner shaft and an outer shaft, wherein the inner shaft and the outer shaft can be driven selectively. The additionally selected gears can then be routed along an indirect path which runs via gearwheels that are arranged on the respective undriven transmission input shaft.

These known dual clutch transmissions, by means of which it is possible, in addition to the existing gearwheel pairs and the gears that result therefrom, to select further gears, require hollow shaft devices for this purpose on the intermediate shafts and, in some cases, also on the transmission input shafts, on which hollow shaft devices in each case at least two gearwheels are arranged, wherein the hollow shafts corotate freely on the transmission input shafts and intermediate shafts but can be connected thereto for conjoint rotation when required.

The use of such hollow shaft arrangements represents not only a high additional weight contribution but also leads to an increase in overall lengths and overall heights and to poorer efficiency of the transmission.

It is therefore the underlying object of the invention to provide a dual clutch transmission which allows a large number of gears without enlarging the dimensions of the transmission and without significantly increasing the weight thereof.

SUMMARY

According to the invention, this object is achieved by virtue of the fact that all the gearwheels arranged on the intermediate shafts are designed as freely rotating wheels and that at least the coupling devices provided for the output gearwheels of the intermediate shafts are of double-acting design.

The invention provides a solution with which it is possible, in a very simple and uncomplicated manner, using a small number of wheel sets, to provide a dual clutch transmission by means of which a high number of gears can be selected. One significant feature here is formed by the output gearwheels arranged on the intermediate shafts, which make it possible to provide "winding path gears". The output gearwheels designed as freely rotating wheels can be connected to their respective intermediate shaft with the aid of coupling devices, wherein attention should be drawn particularly to the fact that at least the coupling devices provided for the output gearwheels of the intermediate shaft are of double-acting design, thus making it possible to use these coupling devices also to connect the respectively adjacent freely rotating wheel arranged on the intermediate shaft to its intermediate shaft in a fixed manner.

The transmission can have four or more wheel sets.

In a preferred illustrative embodiment, the transmission according to the invention is provided with four wheel sets and five coupling devices. In this case, the $1^{st}$ and $4^{th}$ gears are positioned on one intermediate shaft and the $2^{nd}$ and $3^{rd}$ gears are positioned on the other intermediate shaft.

By means of such a transmission, eight forward gears and two reverse gears can be obtained.

This is achieved, for example, by virtue of the fact that the $3^{rd}$, $4^{th}$, $5^{th}$ and $6^{th}$ forward gears can be selected as basic gears.

The $1^{st}$, $2^{nd}$, $7^{th}$ and $8^{th}$ forward gears can then each be designed to be selectable as winding path gears via both intermediate shafts.

In such a design, the $2^{nd}$ to $7^{th}$ forward gears can be selected without interrupting the tractive effort.

As an alternative, the transmission can also have five wheel sets, and six coupling devices.

In this case, the $1^{st}$ and $3^{rd}$ gears are positioned on one of the intermediate shafts and the $5^{th}$ gear is positioned on the other intermediate shaft. The $2^{nd}$ and $4^{th}$ gears can be positioned either on the first or the second intermediate shaft.

By means of a transmission of this kind, eleven forward gears and two reverse gears can be achieved.

In this case, the $4^{th}$ to $8^{th}$ forward gears can be selected as basic gears, while the $1^{st}$ to $3^{rd}$ and the $9^{th}$ to $11^{th}$ forward gears can be selected as winding path gears via the gearwheel sets of both intermediate shafts.

In such a design, the 4$^{th}$ to 9$^{th}$ forward gears can be selected without interrupting the tractive effort.

The invention is illustrated by way of example in the drawing and described in detail below with reference to the drawing, in which:

BRIEF DESCRIPTION OF THE DRAWINGS

FIG. 2 shows a table illustrating the selection of eight forward gears and two reverse gears with the transmission shown in FIG. 1,
FIG. 14 shows a table illustrating the selection of eleven forward gears and two reverse gears with the transmission shown in FIG. 13.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The transmission illustrated in FIGS. 1 to 12 is a dual clutch transmission having four gearwheel pairs of fixed wheels and freely rotating wheels, in which the four gearwheel pairs are indicated by the numbers 1 to 4 and the reverse gear is indicated by R, in each case with a square boundary.

Figure 1:
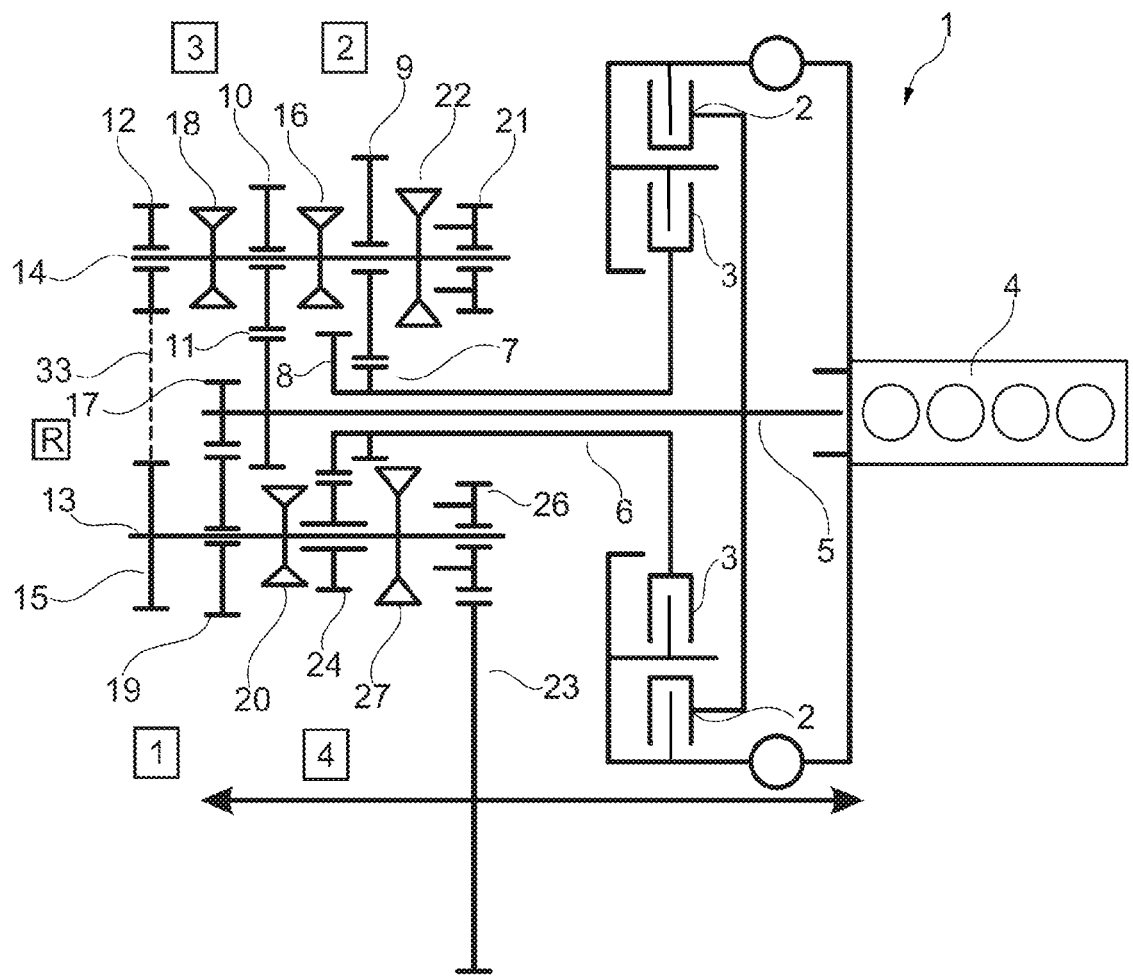
FIG. 1 shows a first illustrative embodiment of the dual clutch transmission according to the invention, having four wheel sets.

The dual clutch transmission 1 illustrated in FIG. 1 comprises two friction clutches 2 and 3 known per se, said clutches transmitting the power flow supplied by an engine 4 selectively to two input shafts. The input shafts are designed as an inner shaft 5 and an outer shaft 6, wherein the inner shaft 5 extends coaxially through the outer shaft 6.

Two gearwheels 7 and 8 are arranged for conjoint rotation on the outer shaft 6.

The inner shaft 5 projects by a certain amount from the outer shaft 6 within the transmission case (not shown in the drawing), wherein two gearwheels 11 and 17 connected for conjoint rotation to the inner shaft 5 are arranged on the end of the inner shaft 5 which projects from the outer shaft 6.

Two intermediate shafts 13 and 14 are furthermore provided, on which shafts gearwheels are likewise arranged. The gearwheels arranged on the intermediate shafts 13, 14 are rotatably mounted as freely rotating wheels and can be connected for conjoint rotation to the intermediate shafts 13 and 14 by means of coupling devices according to the selection of the desired gear.

In the illustrative embodiment shown, gearwheel 8, which is seated on the outer shaft 6, meshes with a gearwheel 24, which is arranged rotatably on the first intermediate shaft 13, while the gearwheel 7 of the outer shaft 6 is in engagement with a gearwheel 9 rotatably mounted on the second intermediate shaft 14.

The gearwheel 17 of the inner shaft 5 meshes with a gearwheel 19 arranged rotatably on the first intermediate shaft 13, while gearwheel 11, which is seated on the inner shaft 5, is in engagement with a gearwheel 10 rotatably mounted on the second intermediate shaft 14.

On the right-hand side in the drawing, the first intermediate shaft 13 is provided with an output gearwheel 26 mounted loosely thereon and, on the same side, the second intermediate shaft 14 has an output gearwheel 21 mounted loosely thereon. On the left-hand side, the first intermediate shaft 13 is fitted with a gearwheel 15 arranged for conjoint rotation thereon, which is in engagement, for reverse gear, with a gearwheel 12 seated rotatably on the second intermediate shaft 14. The engagement of these two gearwheels 15 and 12 is indicated by a dashed line 33.

The output gearwheels 21 and 26 mounted on the right-hand side of the intermediate shafts 13 and 14 both mesh with the differential gearwheel 23, via which the power flow is transmitted to the wheels of the vehicle.

Five coupling devices are provided to shift the transmission, namely one coupling device 27 between the output gearwheel 26 seated on the first intermediate shaft 13 and the gearwheel 24 likewise arranged thereon, and one coupling device 20 between the gearwheels 24 and 19 of the first intermediate shaft 13.

On the second intermediate shaft 14 there is a coupling device 22 between output gearwheel 21 and the adjacent gearwheel 9, another coupling device 16 between the two gearwheels 9 and 10, which are likewise arranged on the second intermediate shaft 14, and a third coupling device 18 between gearwheel 10 and the gearwheel 12 seated at the left-hand end and provided for reverse gear.

All five coupling devices are of double-acting design. In the case of the coupling devices 22 and 27 provided for output gearwheels 21 and 26, for example, this has the effect that output gearwheels 21 and 26 can be connected to their intermediate shafts 13 and 14, respectively, and that an additional winding path gear can be selected in the leftward-shifted position of coupling devices 22 and 27, while, at the same time, output gearwheels 21 and 26 can rotate freely around their respective intermediate shafts 13 and 14.

By means of a transmission of this kind, having four gearwheel pairs and five coupling devices, it is possible to select eight forward gears, these being illustrated in the table shown in FIG. 2. Here, K1 and K2 signify the clutches indicated by 2 and 3 in the drawing, wherein the number "1" denotes the clutch as closed and "0" denotes the clutch as open. IS 1 and IS 2 denote the intermediate shafts 13 and 14 shown in the drawing, and S1, S2, S3, S5 and S6 denote the five coupling devices 20, 16, 18, 22 and 27.

The letter "L" used in the table stands for a displacement of the respective coupling device to the left, the letter "R" stands for a displacement to the right and "0" stands for the neutral position, in which the respective coupling device is set to an inactive state.

This table in FIG. 2 furthermore also shows the shift positions for the two reverse gears R1 and R2.

Each of the following FIGS. 3 to 12 illustrates the power flows associated with the individual gears, wherein the respective power flow is indicated by thick solid lines, while the inactive transmission components are shown in thin lines.

Figure 3:
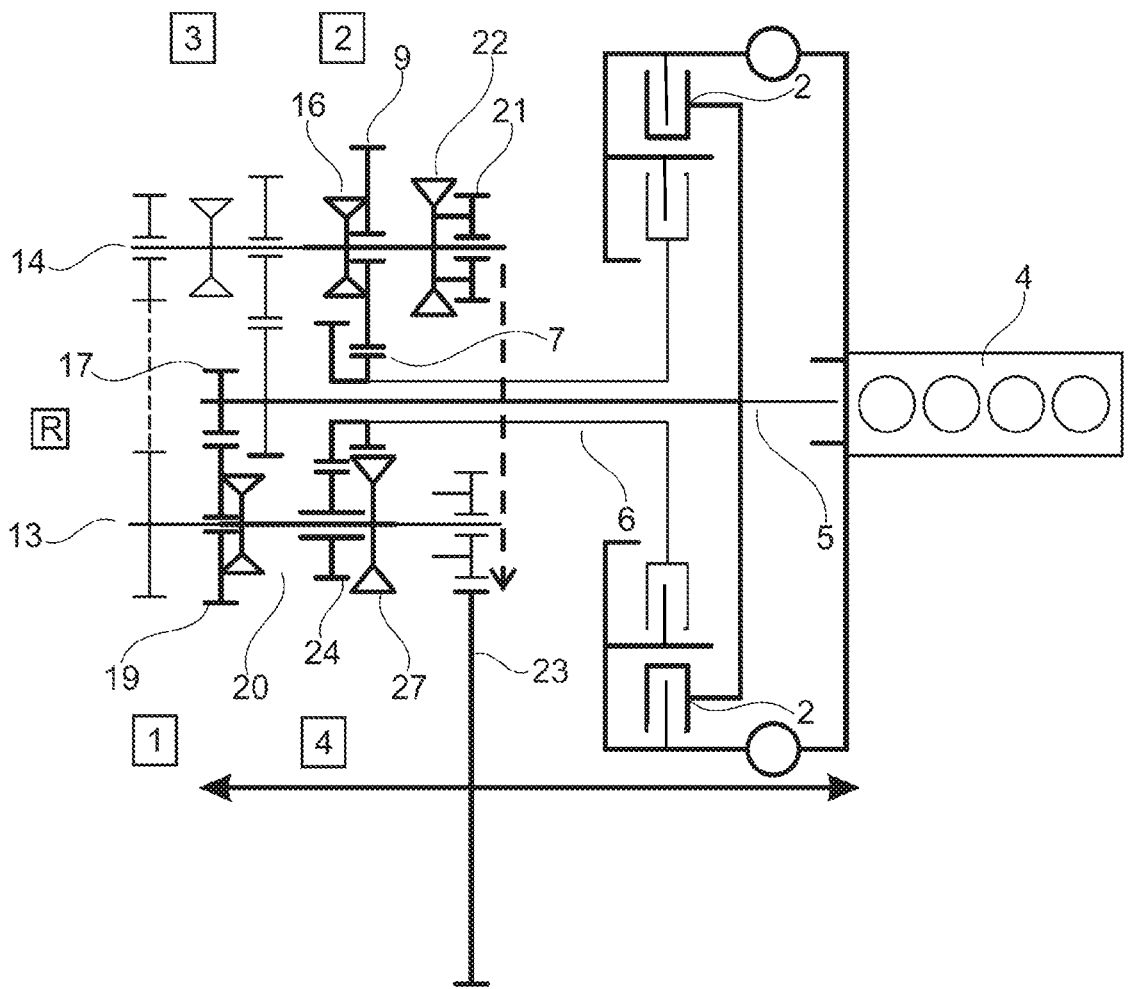
FIG. 3 shows the power flow for the 1$^{st}$ gear.

FIG. 3 illustrates the power flow for the $1^{st}$ gear. Here, the engine 4 drives the inner shaft 5 via friction clutch 2. In this case, gearwheel 17, which is seated in a fixed manner on the inner shaft 5, meshes with gearwheel 19, which is seated on the first intermediate shaft 13 and which is connected for conjoint rotation to the first intermediate shaft 13 by means of coupling device 20.

In the same way, gearwheel 24, which is seated on the first intermediate shaft 13, is connected for conjoint rotation to the first intermediate shaft 13 by means of coupling device 27 and meshes with gearwheel 8, which is seated on the idly corotating outer shaft 6. Here, the gearwheel 7 of the outer shaft 6 meshes with gearwheel 9, which is seated on the second intermediate shaft 14 and which is connected for conjoint rotation to the second intermediate shaft 14 by means of coupling device 16.

In this selected gear, coupling device 22 is shifted to the right and connects output gearwheel 21 for conjoint rotation to the second intermediate shaft 14.

Since both output gearwheels 21 and 26 mesh with the differential gearwheel 23, and output gearwheel 26, which is seated on the first intermediate shaft 13, freely corotates, the differential gearwheel 23 is driven via the output gearwheel 21 of the second intermediate shaft 14 and transmits the power flow to the wheels.

The selection of this $1^{st}$ gear involves a winding path gear, during which the power flows from the inner shaft 5, via the first intermediate shaft 13 and the second intermediate shaft 14, and from there to the differential gearwheel 23.

Figure 4:
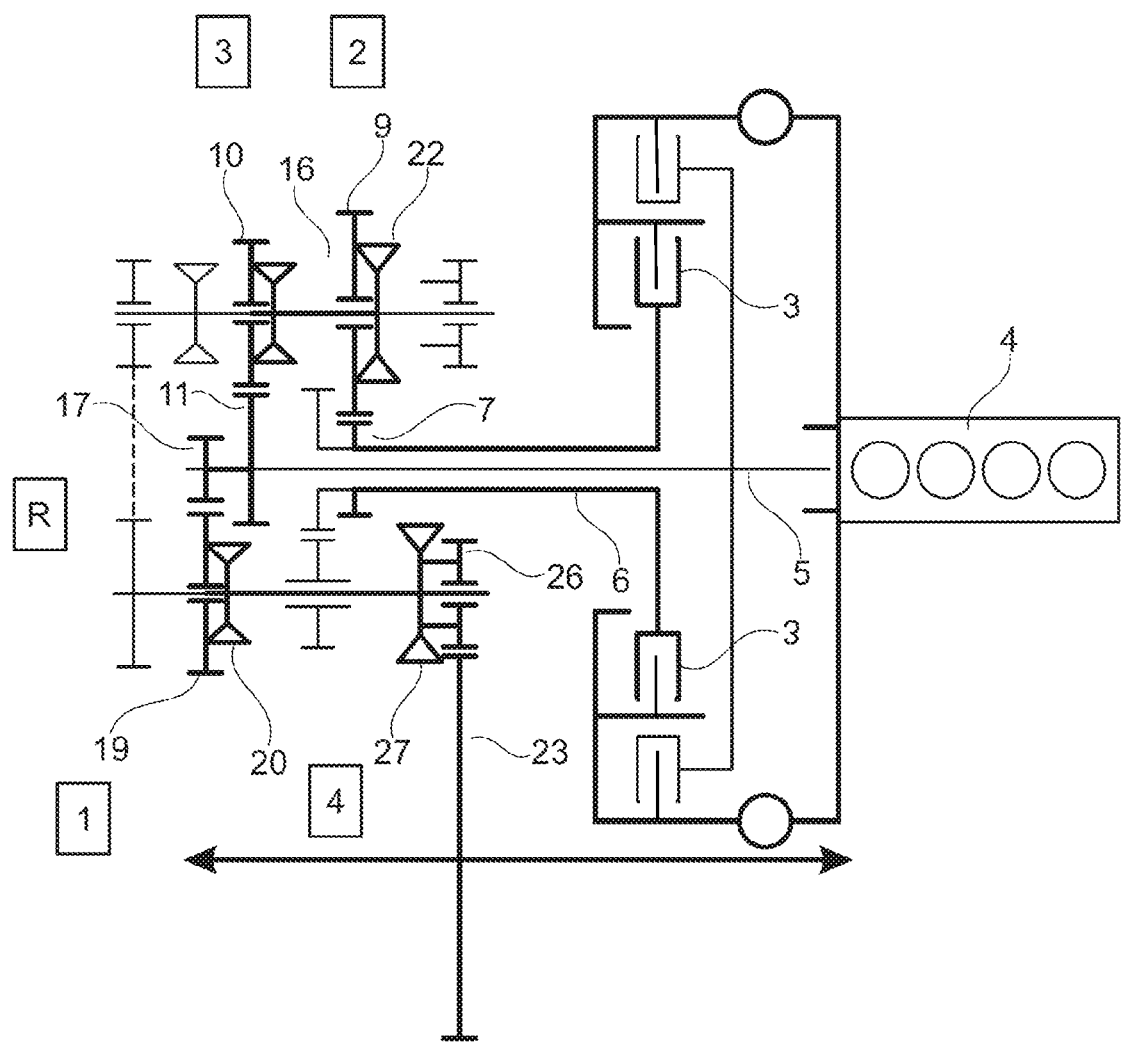
FIG. 4 shows the power flow for the 2$^{nd}$ gear.
Figure 5:
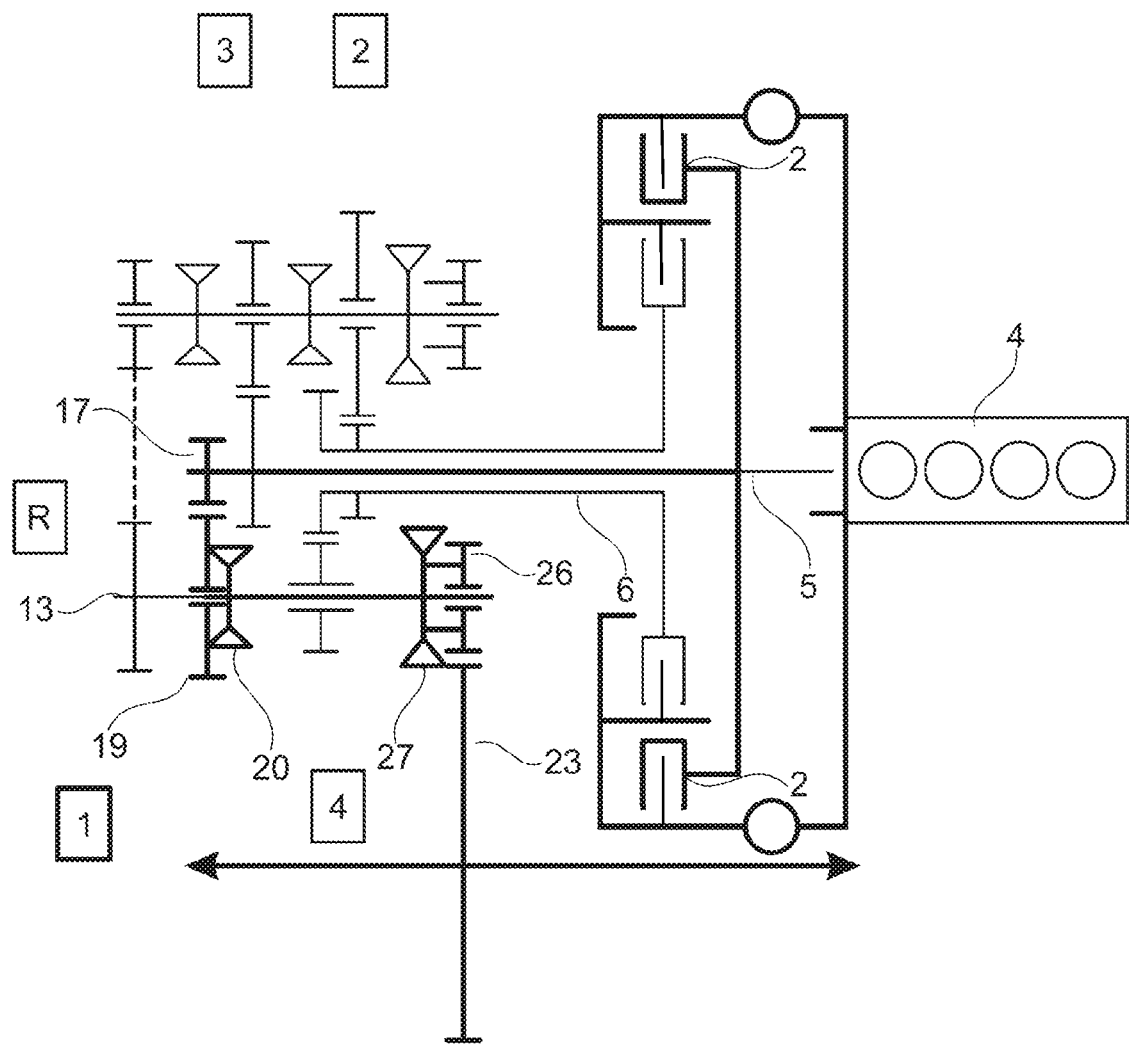
FIG. 5 shows the power flow for the 3$^{rd}$ gear.
Figure 6:
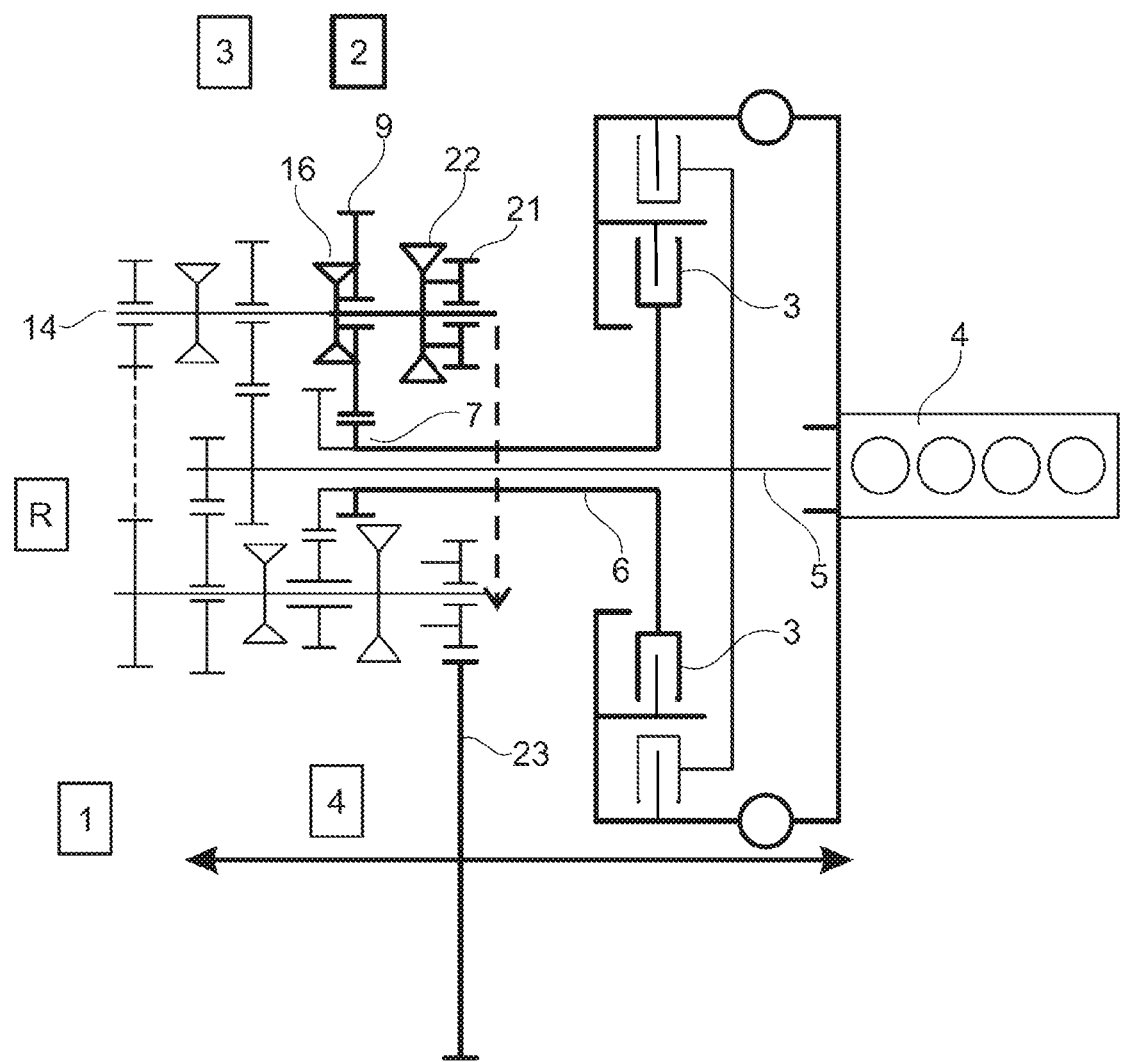
FIG. 6 shows the power flow for the 4$^{th}$ gear.
Figure 7:
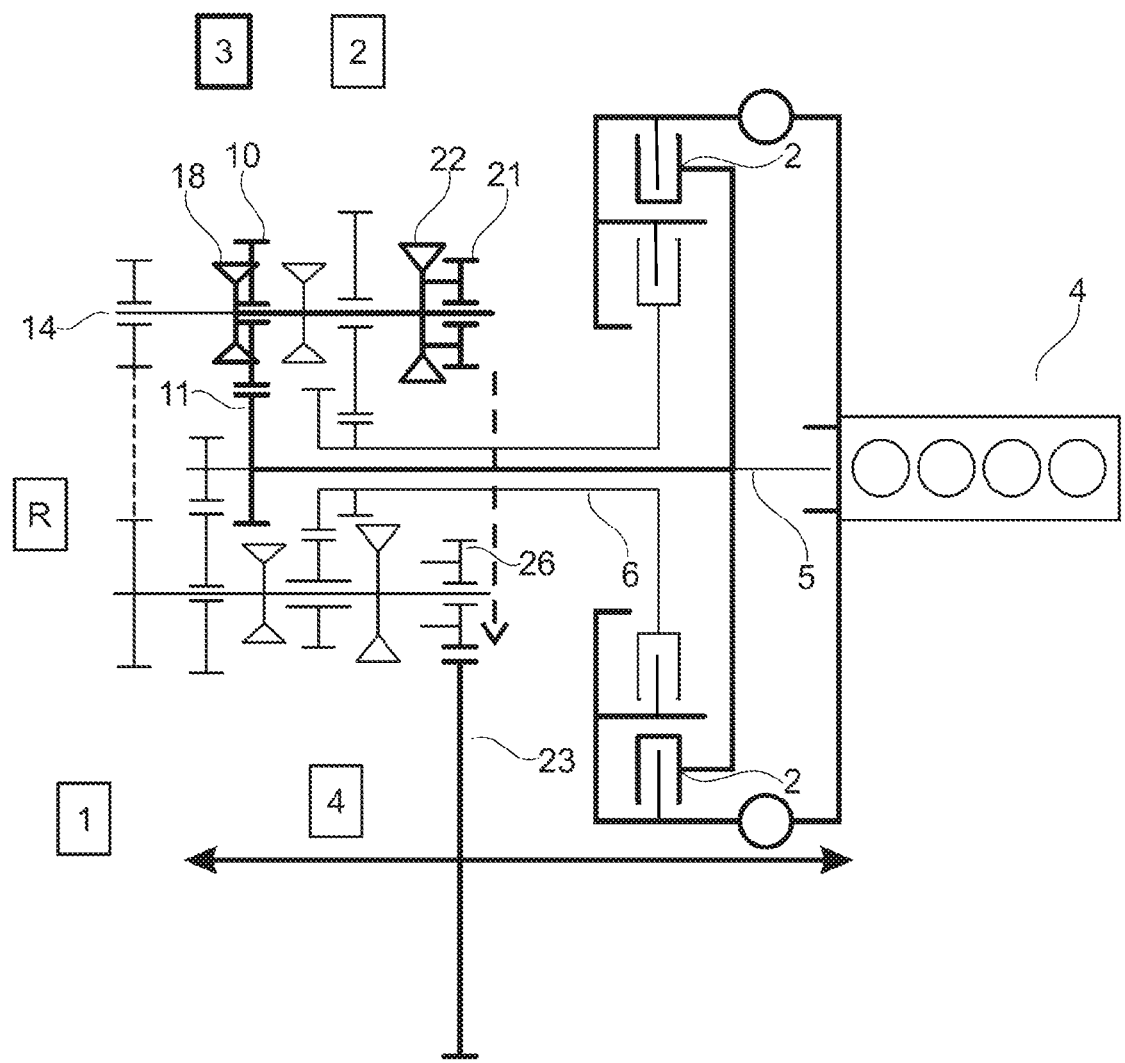
FIG. 7 shows the power flow for the 5$^{th}$ gear.
Figure 8:
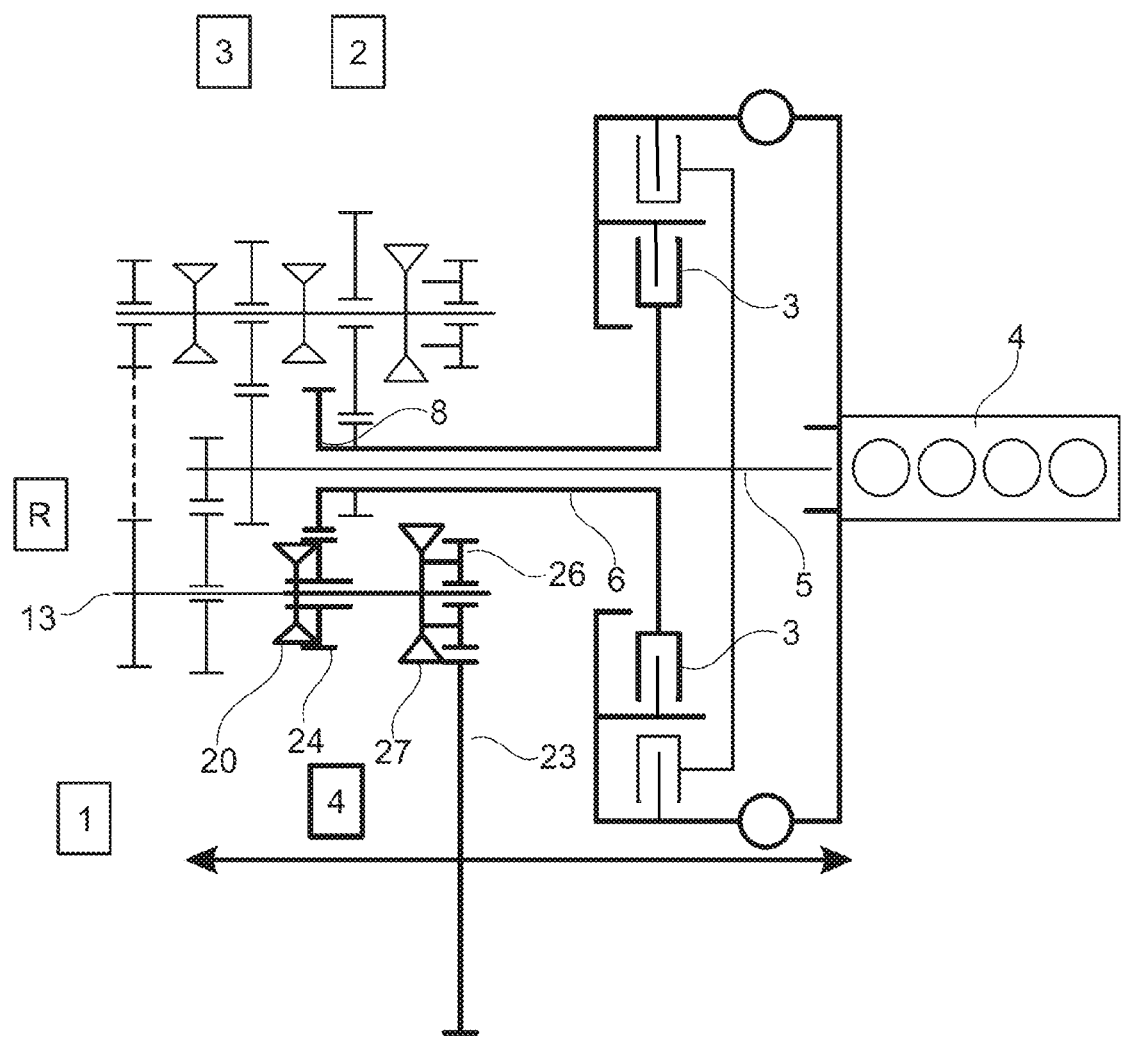
FIG. 8 shows the power flow for the 6$^{th}$ gear.

FIG. 4 illustrates the power flow which defines the $2^{nd}$ gear. This too is a winding path gear since the power flow is transmitted from the engine 4 to the outer shaft 6 via friction clutch 3 and, from there, initially from gearwheel 7, via both gearwheels 9 and 10, which are connected for conjoint rotation to the second intermediate shaft 14 by means of coupling devices 16 and 22, to gearwheels 11 and 17, which are seated on the idly corotating inner shaft 5. From there, the power flows onward to the first intermediate shaft 13, namely via the gearwheel 17 of the inner shaft 5 to gearwheel 19, which meshes with the latter and which is connected for conjoint rotation to the first intermediate shaft 13 by means of coupling device 20. In this design of the $2^{nd}$ gear, output gearwheel 26 is connected in a fixed manner to the first intermediate shaft 13 by means of coupling device 27, allowing output gearwheel 26 to transmit the torque to the differential gearwheel 23.

FIGS. 5 to 8 illustrate the four basic gears, gears three to seven. In these illustrations, the power flows respectively from the engine 4, via one of the two friction clutches 2 or 3, to the inner shaft 5 or the outer shaft 6 and, from there, directly to the differential gearwheel 23 via one of the two intermediate shafts 13 or 14.

Figure 9:
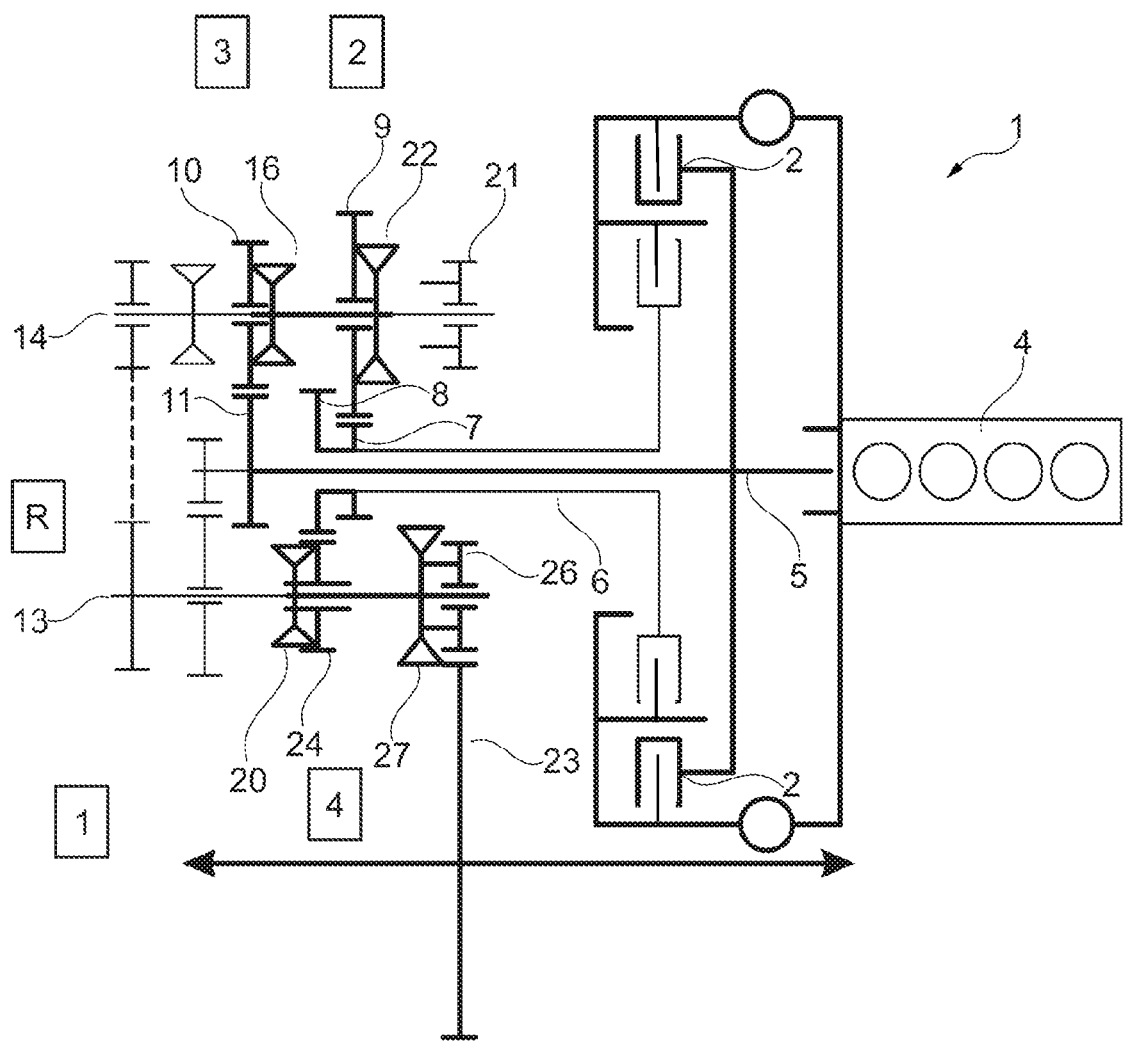
FIG. 9 shows the power flow for the 7$^{th}$ gear.
Figure 10:
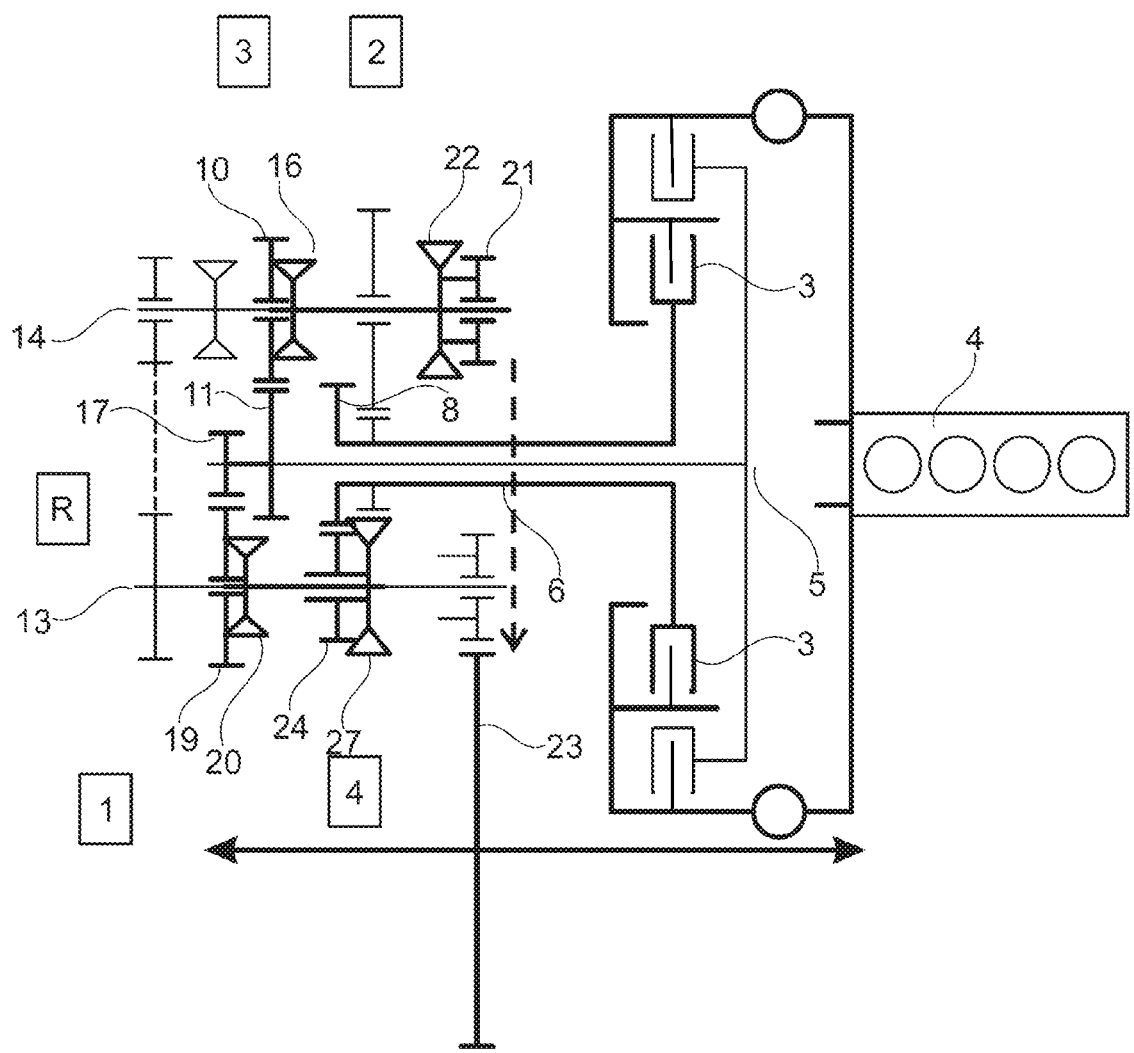
FIG. 10 shows the power flow for the 8$^{th}$ gear.

FIGS. 9 and 10 illustrate gears 7 and 8, which, once again, are selected as winding path gears via both intermediate shafts 13 and 14.

Figure 11:
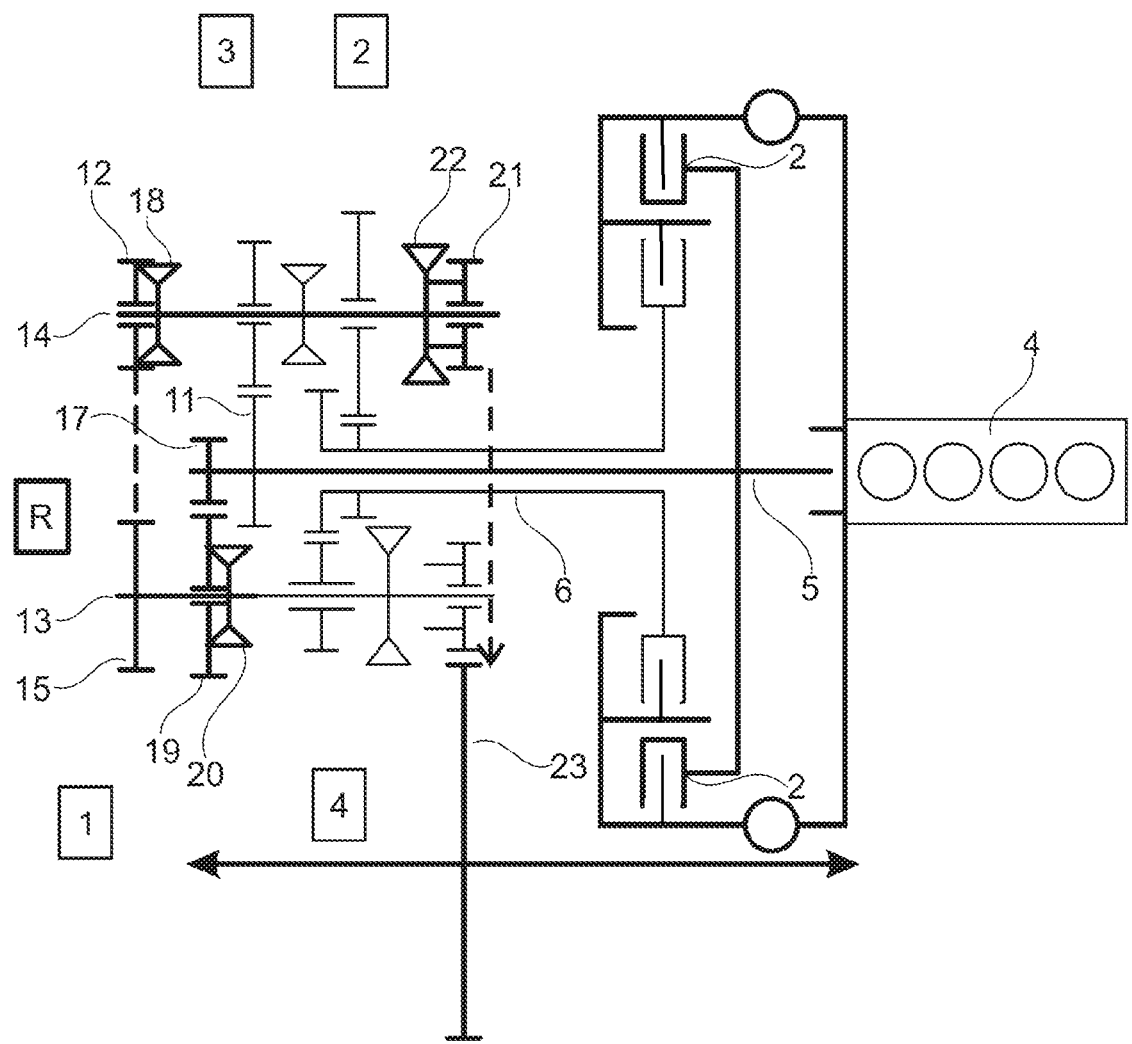
FIG. 11 shows the power flow for the 1$^{st}$ reverse gear.
Figure 12:
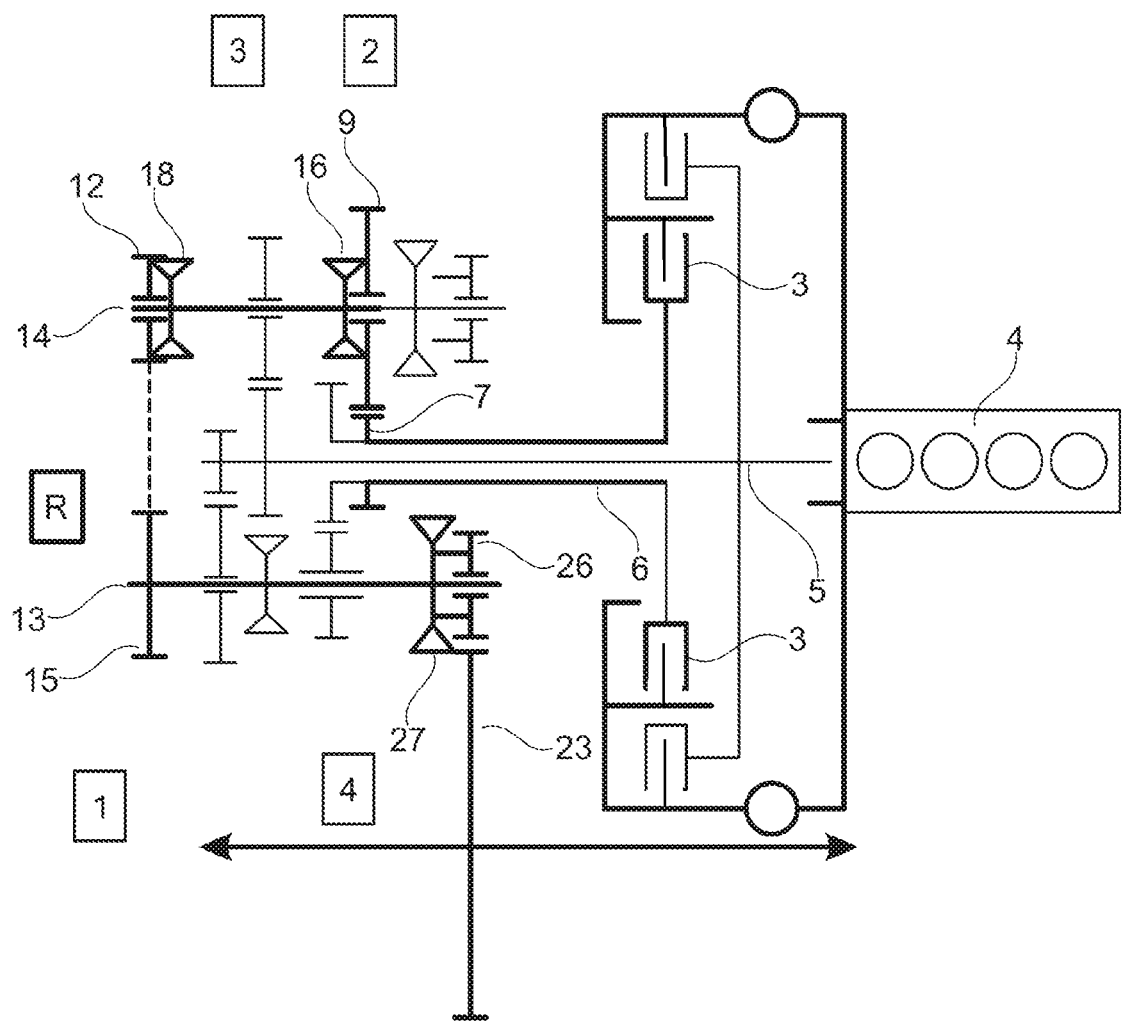
FIG. 12 shows the power flow for the 2$^{nd}$ reverse gear.

FIGS. 11 and 12 illustrate the power flows for the two reverse gears, which, once again, are selected as winding path gears since the power flows pass via both intermediate shafts 13 and 14.

Figure 13:
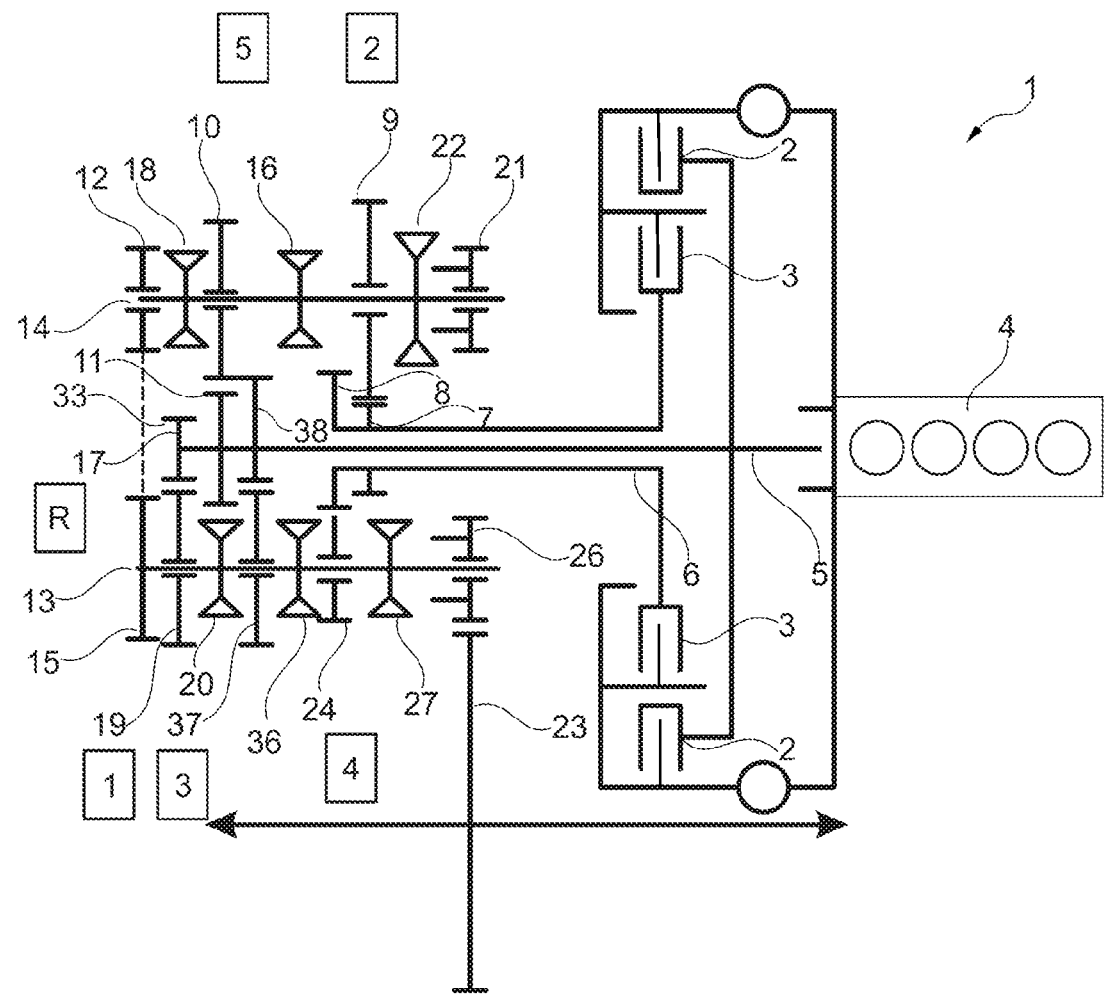
FIG. 13 shows a second illustrative embodiment of the dual clutch transmission according to the invention, having five wheel sets.

FIG. 13 shows a second illustrative embodiment of the invention, in which the transmission has five wheel sets and six coupling devices.

In this figure, the same reference numbers are used for identical components as in FIG. 1.

In contrast to the illustrative embodiment shown in FIG. 1, an additional gearwheel 38 is arranged on the inner shaft 5, being connected in a fixed manner to said shaft and being in engagement with a gearwheel 37 rotatably mounted on the first intermediate shaft 13.

A further coupling device 36 is arranged between gearwheel 37, which is mounted on the first intermediate shaft 13, and gearwheel 24, which is arranged to the right thereof in the drawing, which coupling device is of double-acting design and selectively connects either gearwheel 24 or gearwheel 37 for conjoint rotation to the first intermediate shaft 13.

In the illustrative embodiment shown in FIG. 13, gearwheel pairs 1, 3 and 4 extend along the first intermediate shaft 13, and gearwheel pairs 5 and 2 extend along the second intermediate shaft 14.

By means of the transmission illustrated in FIG. 13, eleven forward gears and two reverse gears can be selected.

FIG. 14 shows the shift pattern for the transmission illustrated in FIG. 13. The two friction clutches K1 and K2 are once again shown on the left-hand side, bearing the reference numbers 2 and 3, wherein the number "1" denotes the clutch as closed and "0" denotes the clutch as open.

In the central area, the positions of the coupling devices (CD) are illustrated, wherein "L"=left-hand position, "R"=right-hand position and "0"=neutral position.

Forward gears 1 to 11 and the two reverse gears R1 and R2 are shown in the following right-hand column.

The $1^{st}$ to $3^{rd}$ gears are winding path gears, in which there is an interruption in the tractive effort. The $4^{th}$ to $8^{th}$ gears are the five basic gears which can be selected without an interruption in the tractive effort by means of the available gearwheel pairs. The $9^{th}$ gear is once again a winding path gear but without an interruption in the tractive effort. The $10^{th}$ and $11^{th}$ gears are once again winding path gears but with an interruption in the tractive effort.

The following FIGS. 15 to 27 illustrate the power flow for each individual gear in thick solid lines, while the inactive regions of the transmission are illustrated in thin lines.

Figure 15:
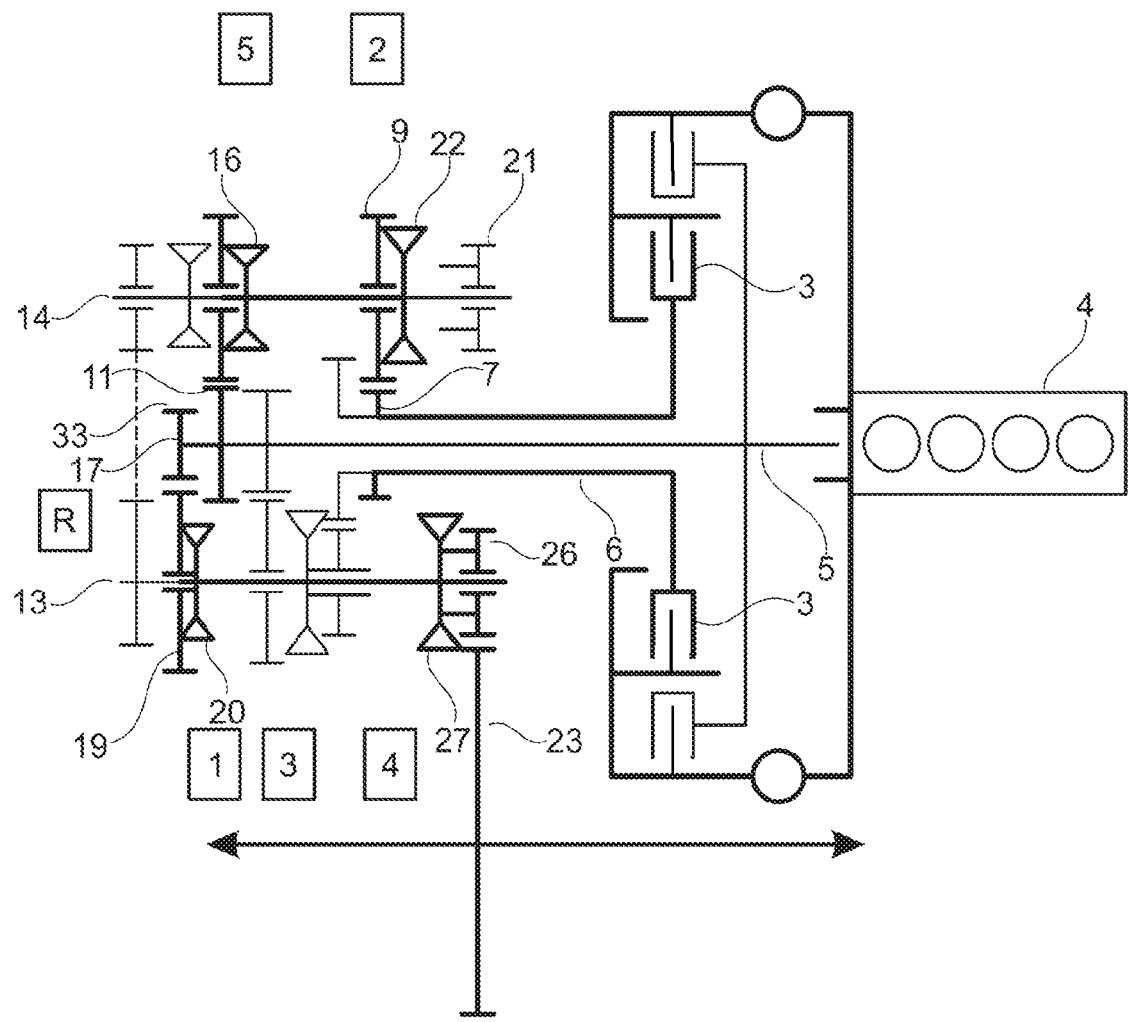
FIG. 15 shows the power flow for the 1$^{st}$ gear.

FIG. 15 shows the selection of the $1^{st}$ gear, which is a winding path gear with an interruption in the tractive effort. In this $1^{st}$ gear, the power flows from the engine 4, via friction clutch 3, to the outer shaft 6 and, from there, via gearwheel 7, which is seated in a fixed manner on the outer shaft, to gearwheel 9, which is seated on the second intermediate shaft 14 and which is connected for conjoint rotation to the intermediate shaft 14 by means of coupling device 22. Via gearwheel 10, which is likewise connected for conjoint rotation to the second intermediate shaft 14 by means of coupling device 16, the power flows via gearwheel 11 to the idly corotating inner shaft 5 and, from there, passes via gearwheel 17 and via gearwheel 19, which meshes with the latter, to the second intermediate shaft 14, wherein gearwheel 19 is connected for conjoint rotation to the first intermediate shaft 13 by means of coupling device 20.

In this selection, output gearwheel 26, which is seated on the first intermediate shaft 13, is connected for conjoint rotation to the first intermediate shaft 13 by means of coupling device 27, with the result that the power is transmitted from output gearwheel 26 to the differential gearwheel 23, while output gearwheel 21, which is seated on the second intermediate shaft 14, is decoupled and idly corotates.

Figure 16:
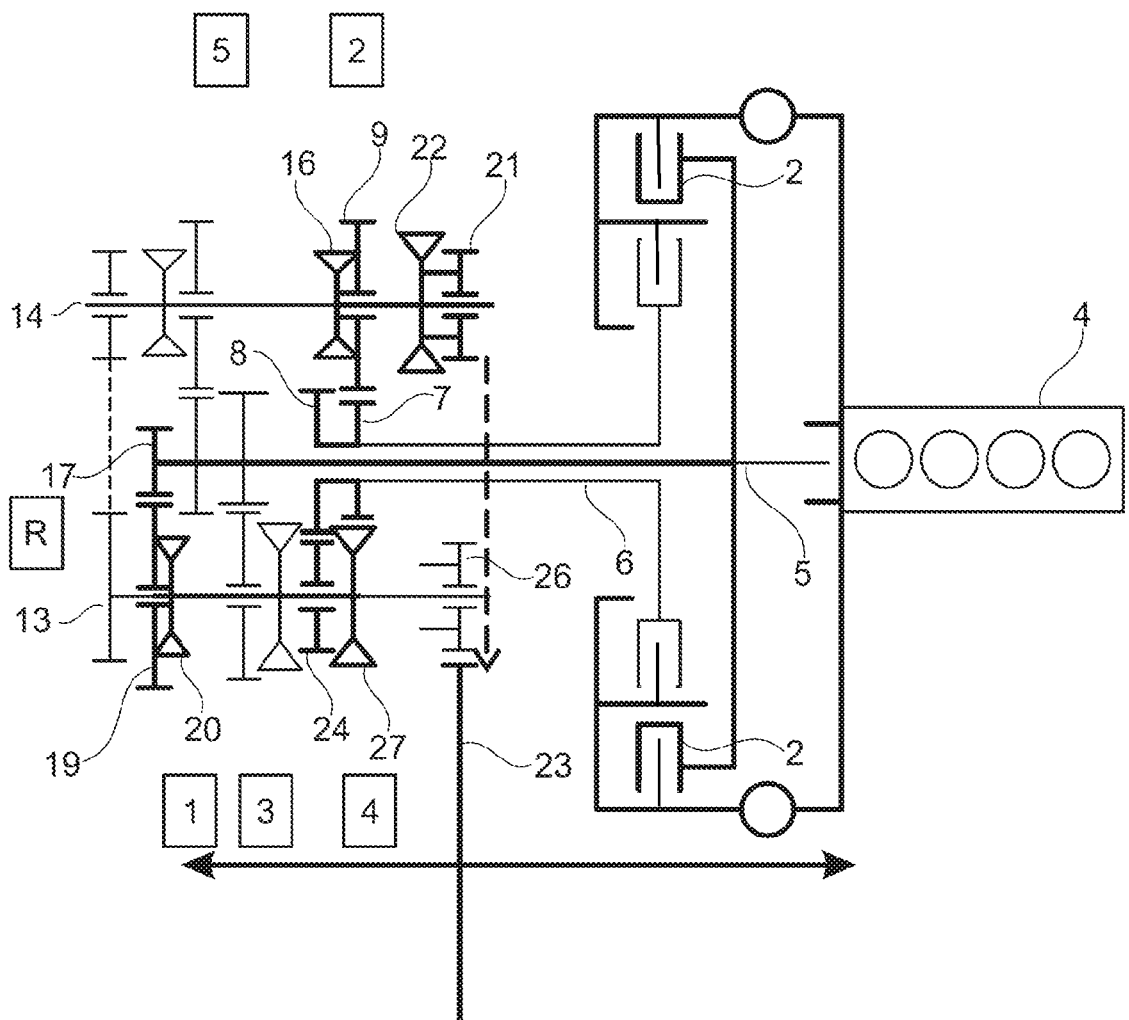
FIG. 16 shows the power flow for the 2$^{nd}$ gear.
Figure 17:
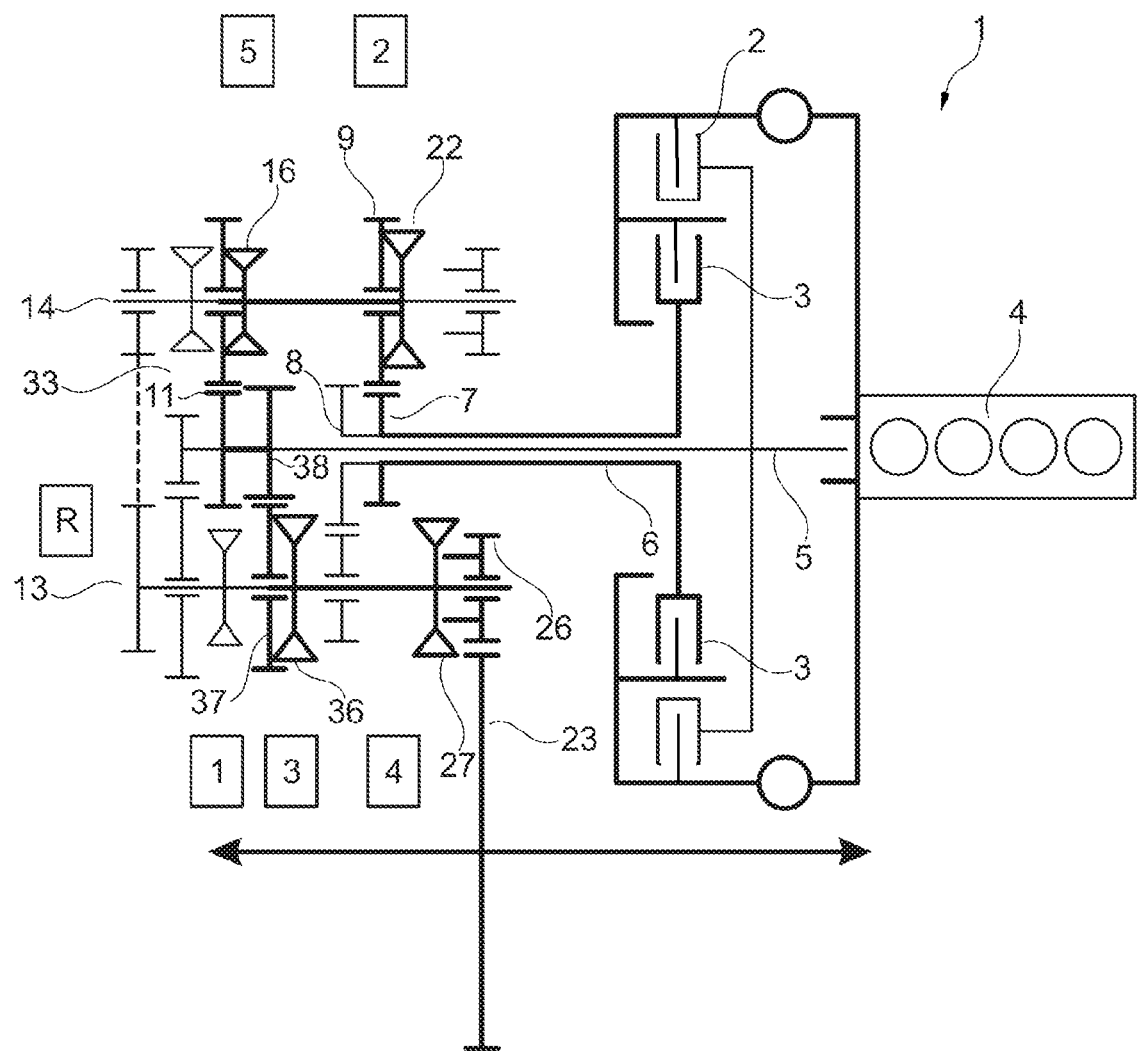
FIG. 17 shows the power flow for the 3$^{rd}$ gear.
Figure 18:
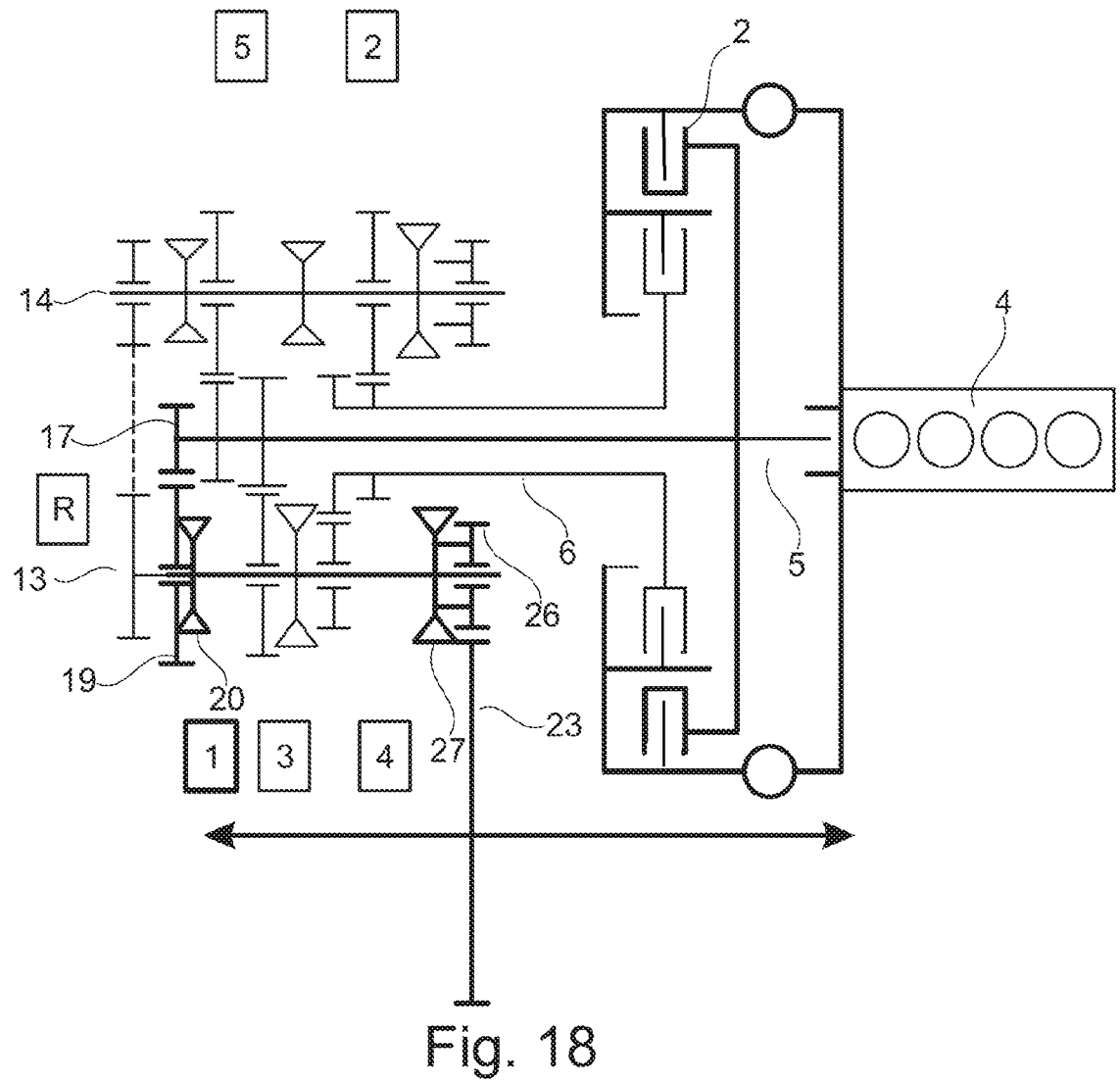
FIG. 18 shows the power flow for the 4$^{th}$ gear.
Figure 19:
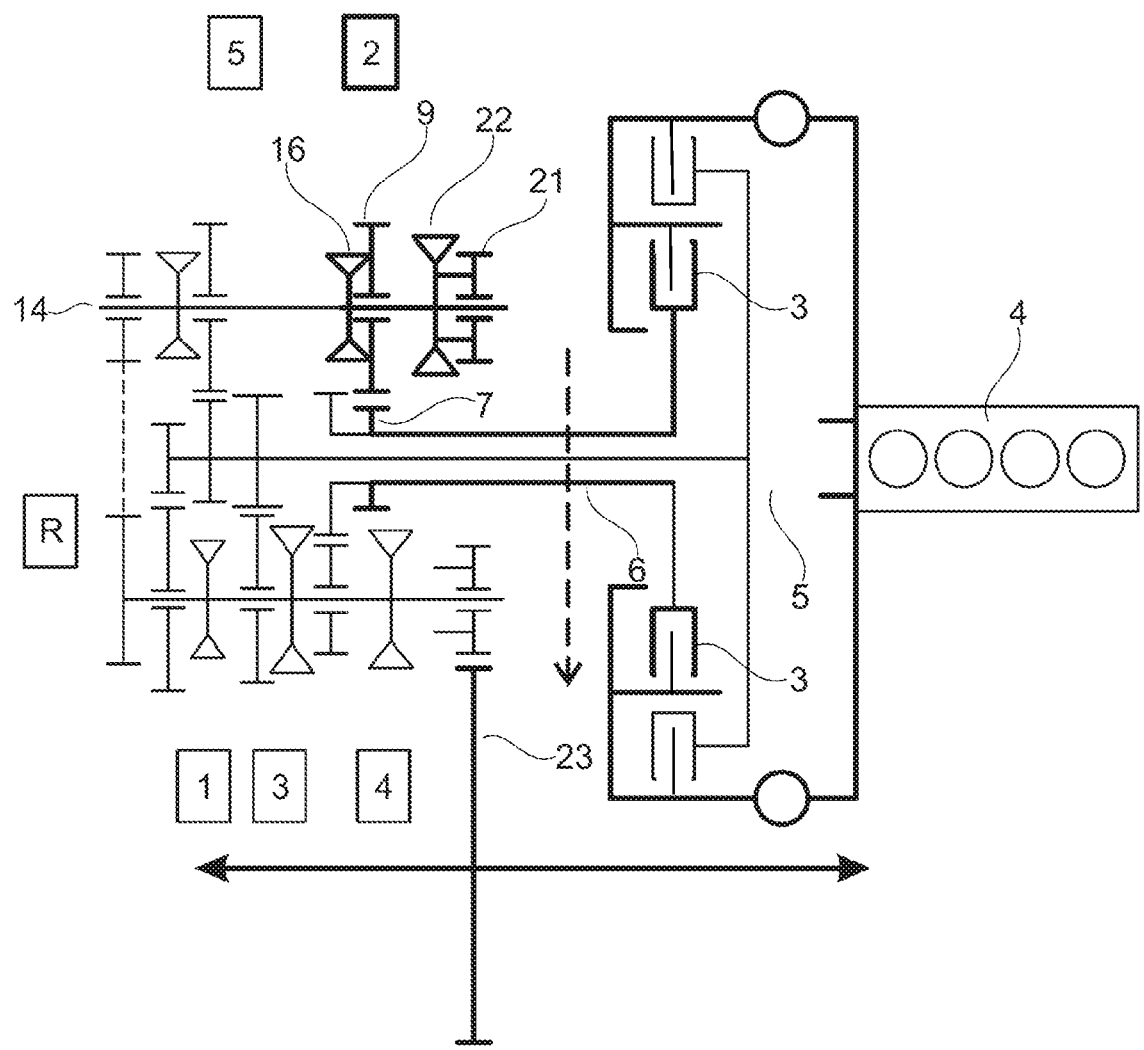
FIG. 19 shows the power flow for the 5$^{th}$ gear.
Figure 20:
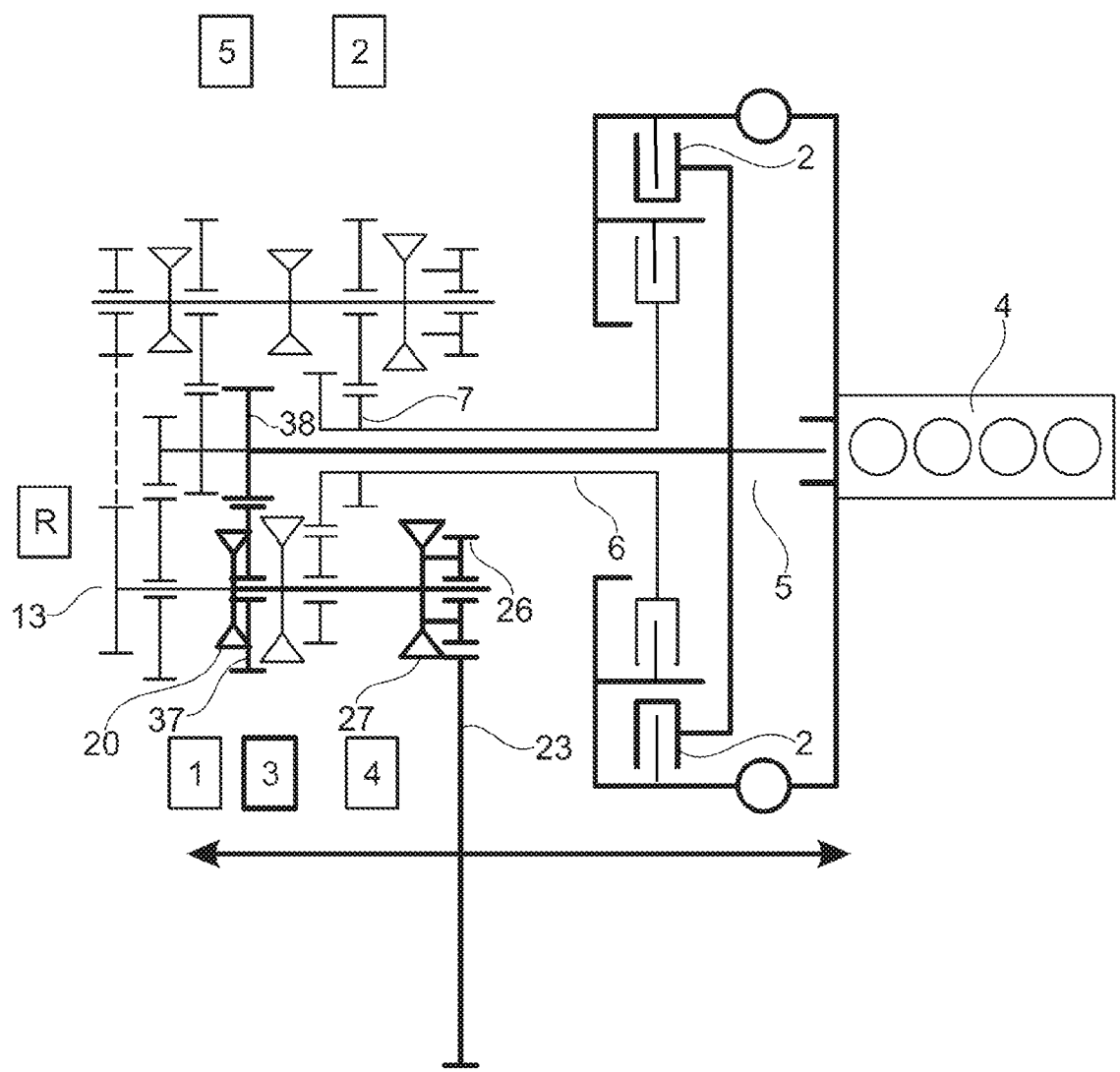
FIG. 20 shows the power flow for the 6$^{th}$ gear.
Figure 21:
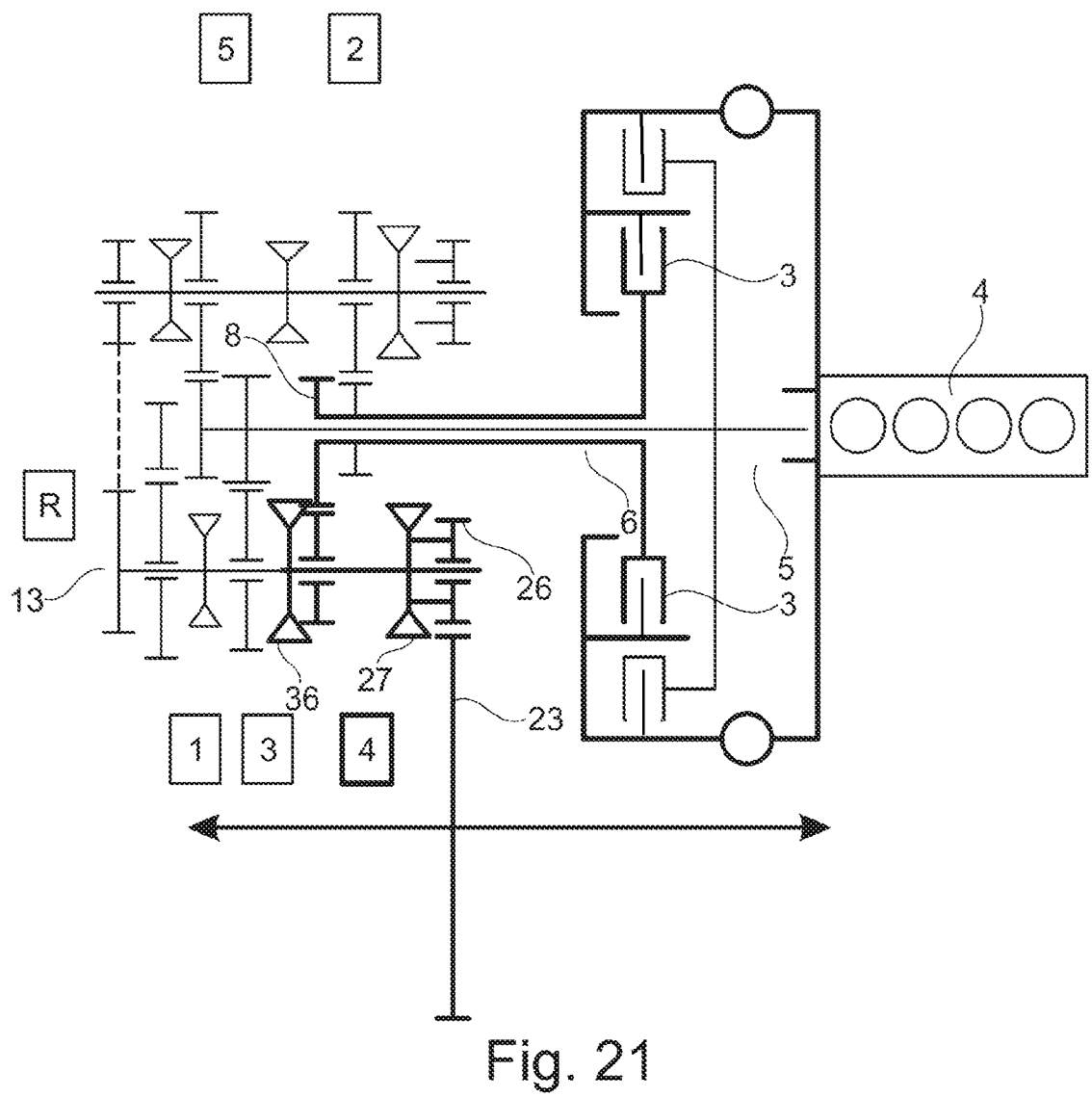
FIG. 21 shows the power flow for the 7$^{th}$ gear.
Figure 22:
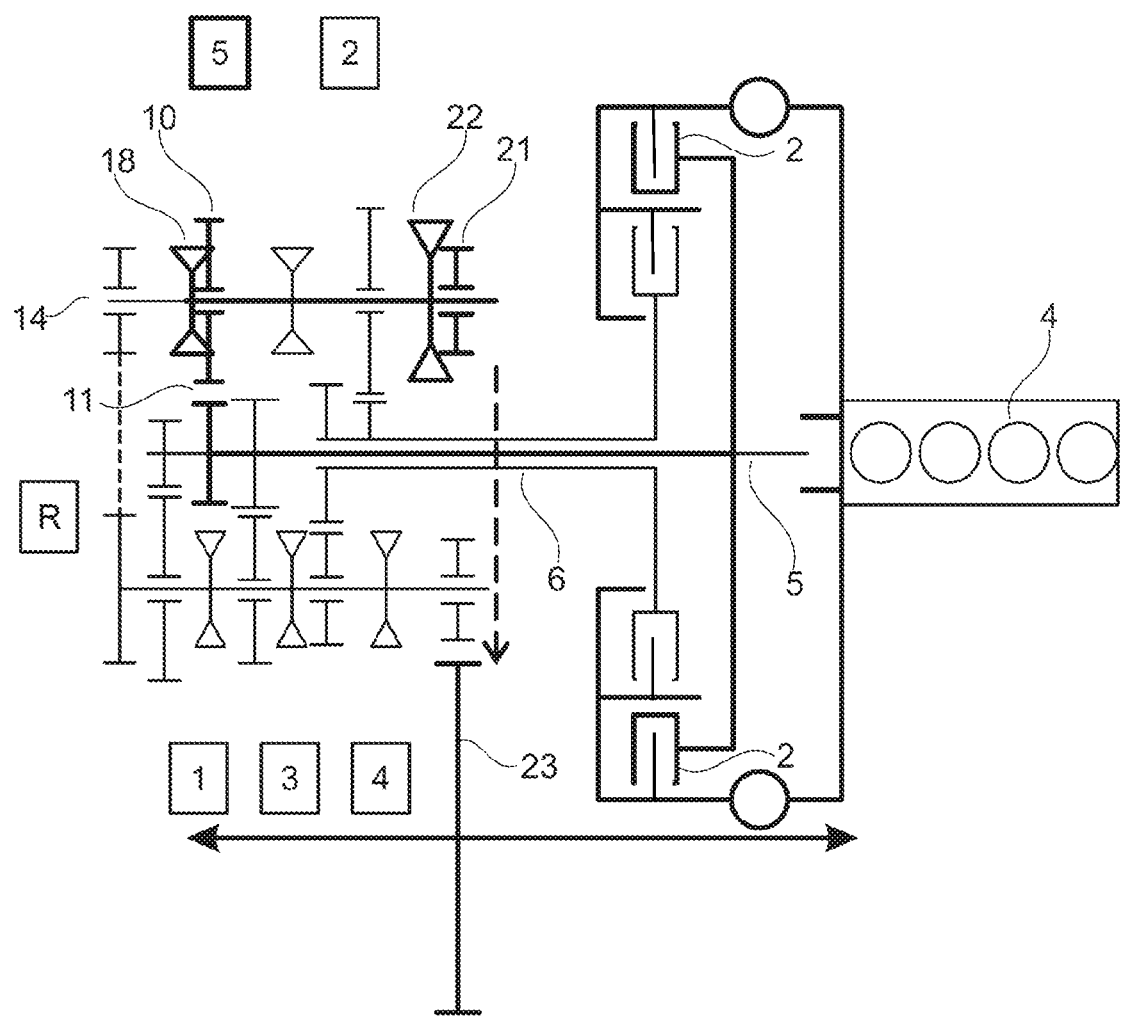
FIG. 22 shows the power flow for the 8$^{th}$ gear.

FIGS. 16 and 17 illustrate the shifts for the $2^{nd}$ and $3^{rd}$ gears, wherein it is clear from the power flow that these are likewise winding path gears, especially since the power flows via both intermediate shafts 13 and 14.

FIGS. 18 to 22 illustrate the power flow for the $4^{th}$ to $8^{th}$ gears. These are the five basic gears, which are derived from the five gearwheel pairs. In each case, the power only ever flows via one of the two intermediate shafts 13 and 14.

Figure 23:
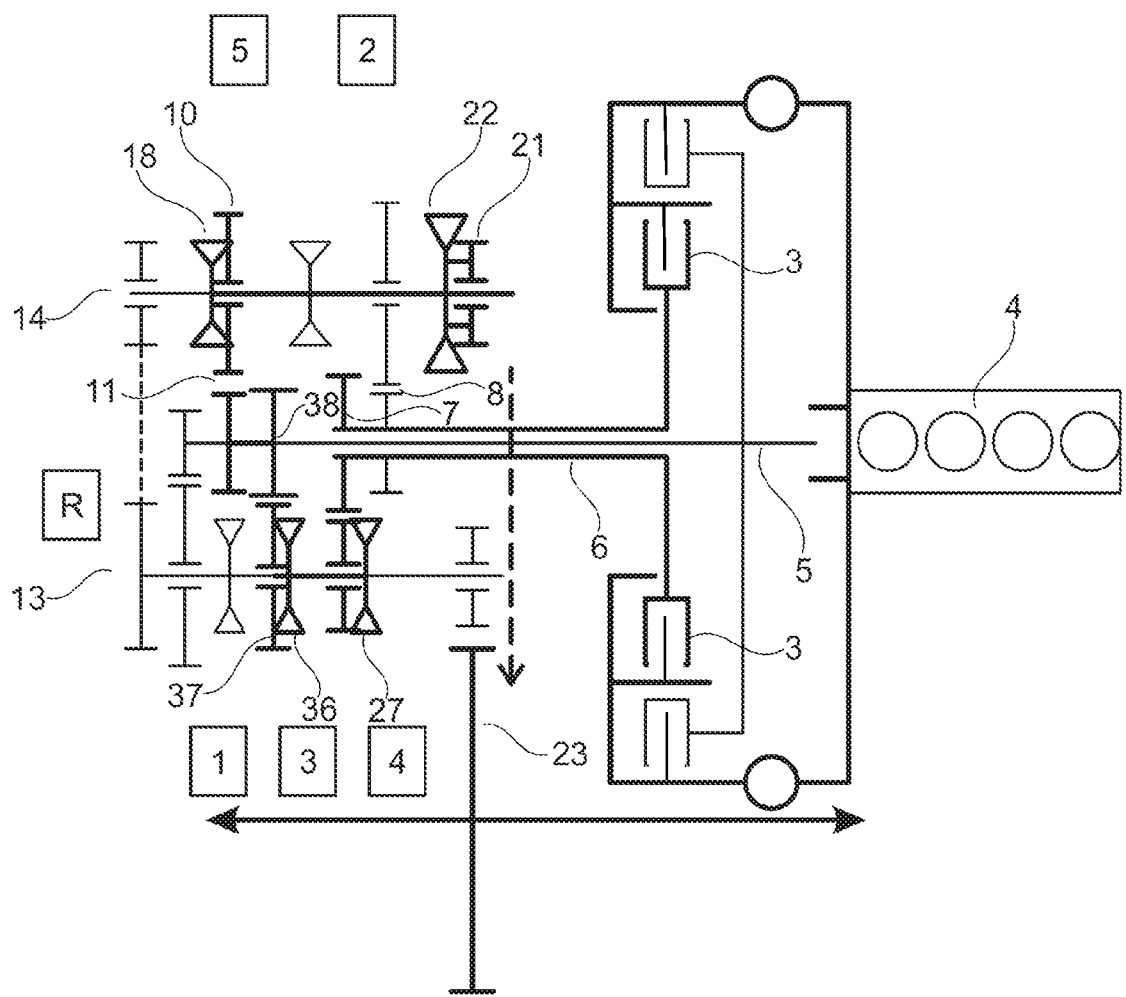
FIG. 23 shows the power flow for the 9$^{th}$ gear.
Figure 24:
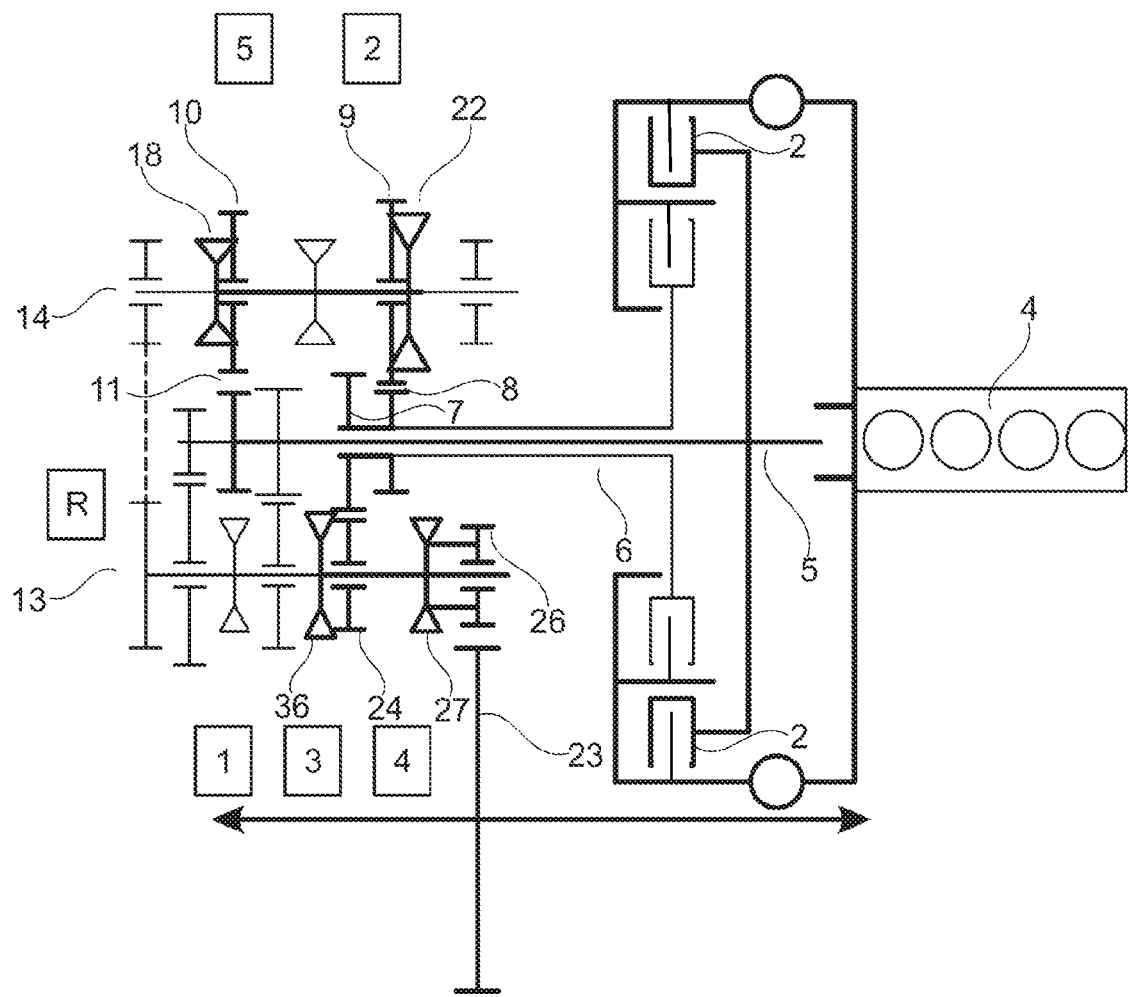
FIG. 24 shows the power flow for the 10$^{th}$ gear.
Figure 25:
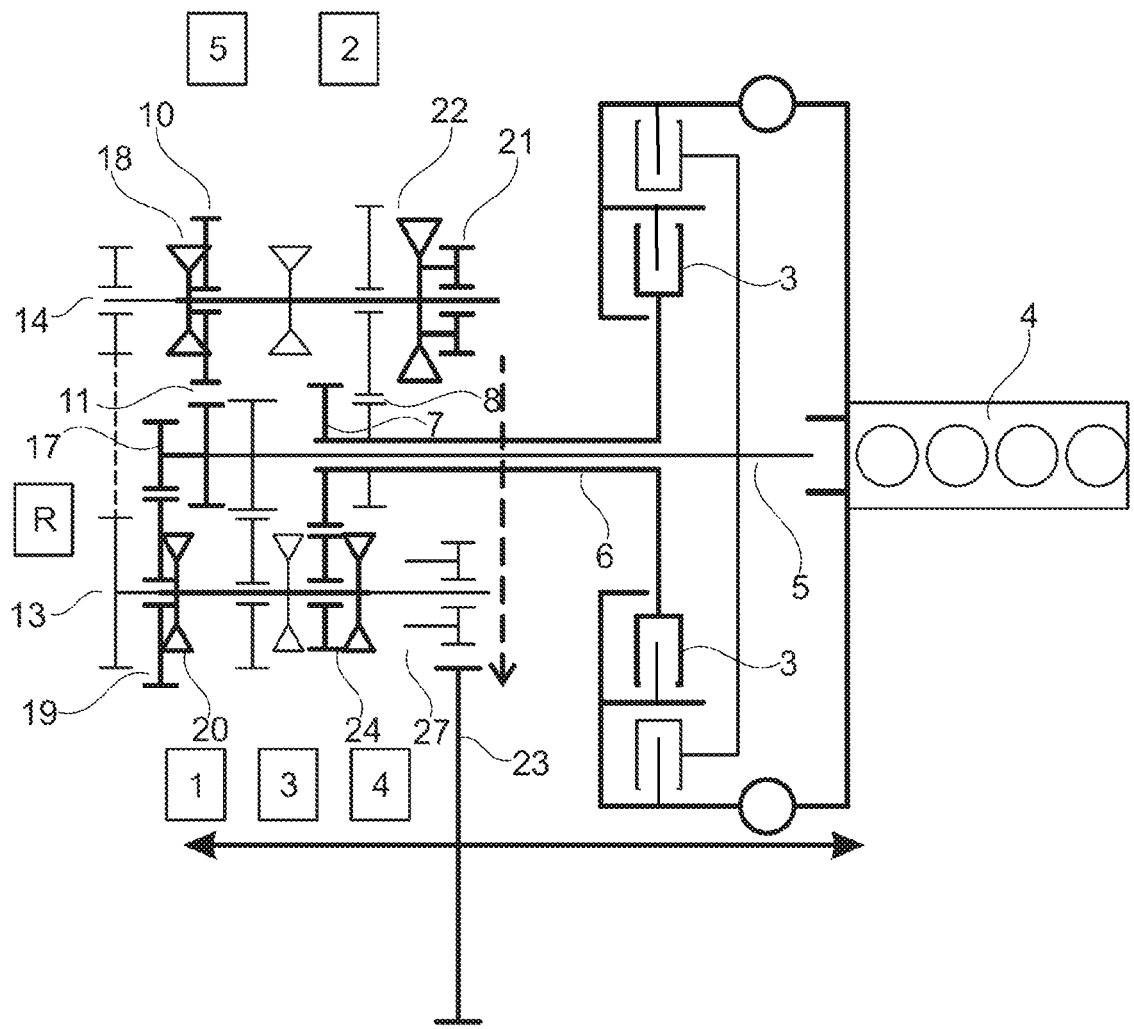
FIG. 25 shows the power flow for the 11$^{th}$ gear.

FIGS. 23 to 25 illustrate the power flows in the $9^{th}$ to $11^{th}$ gears. These are once again winding path gears since the respective power flow is via both intermediate shafts 13 and 14.

Figure 26:
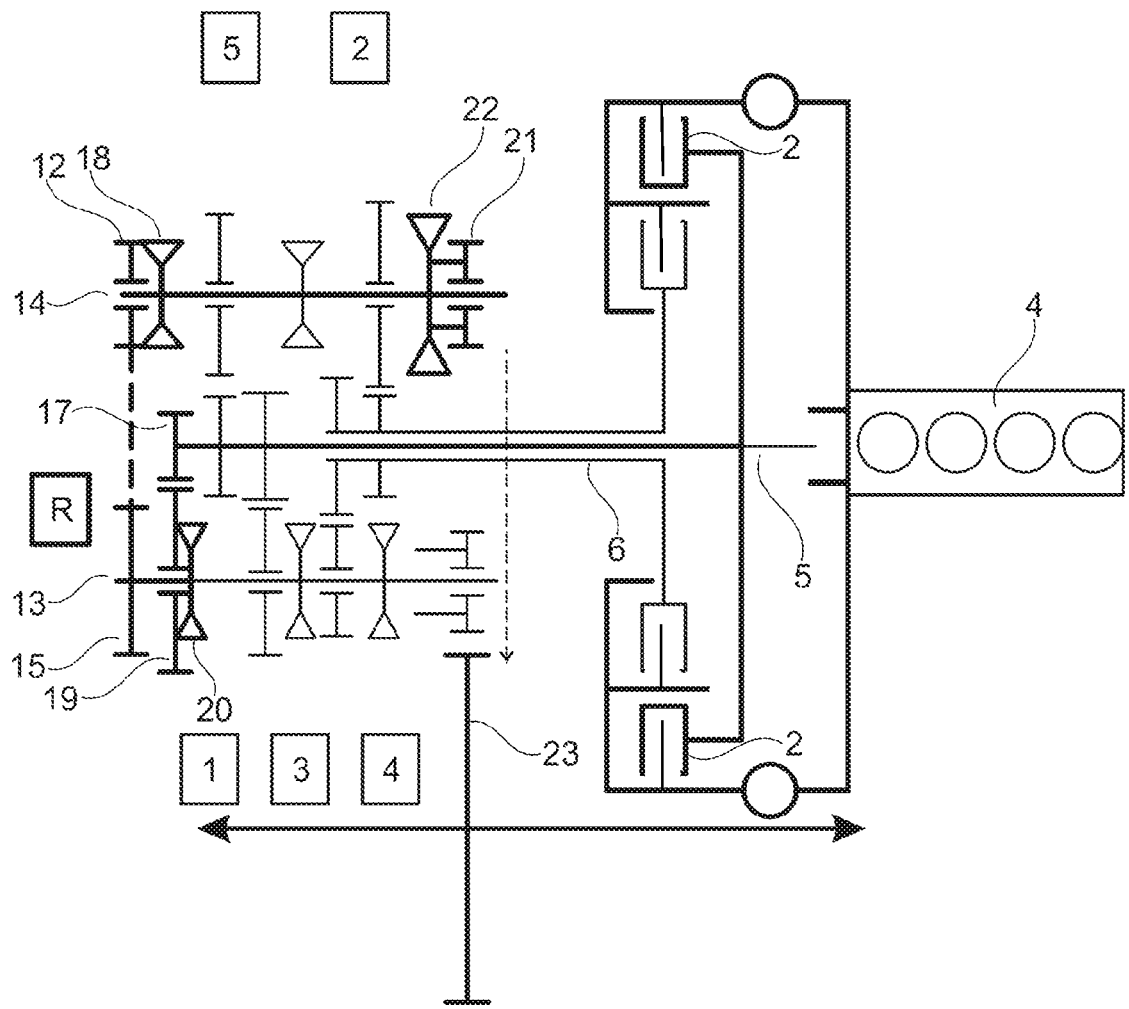
FIG. 26 shows the power flow for the 1$^{st}$ reverse gear.
Figure 27:
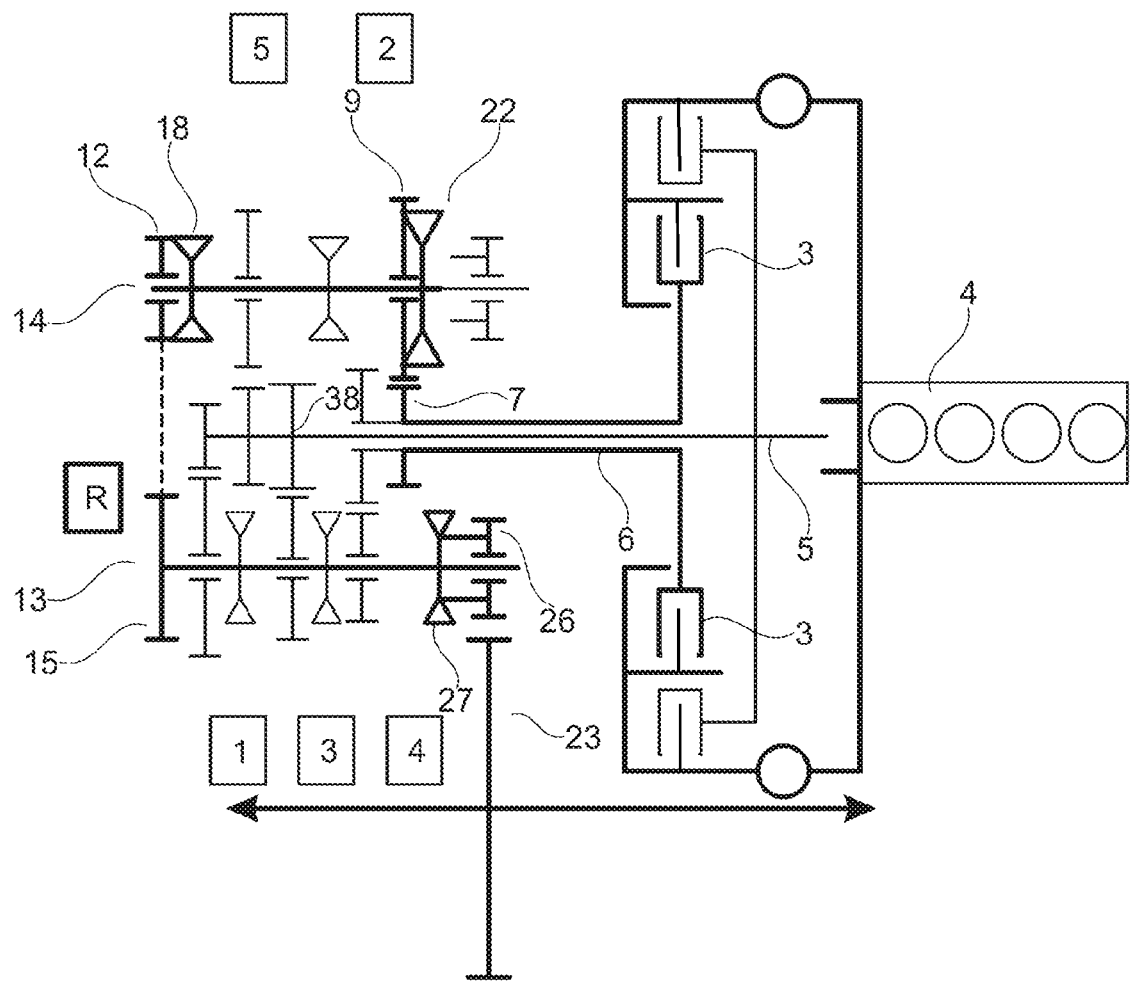
FIG. 27 shows the power flow for the 2$^{nd}$ reverse gear.

FIGS. 26 and 27 illustrate the respective power flow for the two reverse gears, and these are likewise winding path gears since the respective power flow is once again via both intermediate shafts 13 and 14.

As is apparent from the two illustrative embodiments, relatively large numbers of gears are possible with relatively few wheel sets, wherein there are only relatively small jumps between the individual gears and the intervals can be set in an optimum manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual clutch transmission for motor vehicles comprising:
    first and second input shafts;
    two clutches configured to selectively couple the first and second input shafts, respectively, to an engine;
    first and second intermediate shafts arranged parallel to the input shafts;
    four gearwheel pairs of which a fixed gearwheel is arranged on one of the input shafts and a freely rotating gearwheel is arranged on one of the intermediate shafts, wherein first and fourth gears are positioned on one of the intermediate shafts and second and third gears are positioned on the other intermediate shaft, and wherein third, fourth, fifth and sixth forward gears can be selected as basic gears, and first, second, seven and eight forward gears can be selected as winding path gears via both intermediate shafts;
    first and second freely rotating output gearwheels arranged on the first and second intermediate shafts respectively, wherein each output gearwheel meshes with a differential wheel; and
    five coupling devices configured to selectively couple the freely rotating wheels to the respective intermediate shafts, wherein coupling devices provided for the output gearwheels are of double-acting design, wherein eight forward gears and two reverse gears can be selected, and single step shifts from second through seventh forward gears can be completed without interrupting tractive effort.

2. The dual clutch transmission of claim 1 wherein all coupling devices are of double-acting design.

3. The dual clutch transmission of claim 1 wherein the plurality of gearwheel pairs includes four or more gearwheel pairs.

4. A dual clutch transmission for motor vehicles comprising:
    first and second input shafts;
    two clutches configured to selectively couple the first and second input shafts, respectively, to an engine;
    first and second intermediate shafts arranged parallel to the input shafts;
    five gearwheel pairs of which a fixed gearwheel is arranged on one of the input shafts and a freely rotating gearwheel is arranged on one of the intermediate shafts;
    first and second freely rotating output gearwheels arranged on the first and second intermediate shafts respectively, wherein each output gearwheel meshes with a differential wheel; and
    six coupling devices configured to selectively couple the freely rotating wheels to the respective intermediate shafts, wherein coupling devices provided for the output gearwheels are of double-acting design, and wherein the five gear wheel pairs and the coupling devices cooperate to create eleven forward gears and two reverse gears and wherein fourth through eight forward gears can be selected as basic gears, and first through third and ninth through eleventh forward gears can be selected as winding path gears via both intermediate shafts, wherein single step shifts from fourth through ninth forward gears can be completed without interrupting tractive effort.

* * * * *